US011121846B2

United States Patent
Fu et al.

(10) Patent No.: US 11,121,846 B2
(45) Date of Patent: Sep. 14, 2021

(54) METHOD AND APPARATUS FOR TRANSMITTING DATA OR CONTROL INFORMATION IN WIRELESS COMMUNICATION SYSTEM

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Chenxi Hao, Beijing (CN); Qi Xiong, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 49 days.

(21) Appl. No.: 16/319,198

(22) PCT Filed: Jul. 18, 2017

(86) PCT No.: PCT/KR2017/007722
§ 371 (c)(1),
(2) Date: Jan. 18, 2019

(87) PCT Pub. No.: WO2018/016848
PCT Pub. Date: Jan. 25, 2018

(65) Prior Publication Data
US 2019/0280841 A1  Sep. 12, 2019

(30) Foreign Application Priority Data

Jul. 18, 2016  (CN) .......................... 201610565194.9
Dec. 6, 2016  (CN) .......................... 201611109764.X
Jul. 18, 2017  (KR) ........................ 10-2017-0090917

(51) Int. Cl.
*H04W 4/00*  (2018.01)
*H04L 5/00*  (2006.01)
(Continued)

(52) U.S. Cl.
CPC .......... *H04L 5/0064* (2013.01); *H04L 5/0026* (2013.01); *H04L 5/0035* (2013.01);
(Continued)

(58) Field of Classification Search
CPC ............... H04W 72/042; H04W 76/27; H04W 72/0453; H04W 72/1247; H04W 72/1289;
(Continued)

(56) References Cited

U.S. PATENT DOCUMENTS

2008/0101281 A1* 5/2008 Harris ..................... H04L 69/04
370/328
2009/0268680 A1* 10/2009 Nam ..................... H04W 64/00
370/329
(Continued)

OTHER PUBLICATIONS

ISA/KR, International Search Report and Written Opinion of the International Searching Authority for International Application No. PCT/KR2017/007722, dated Nov. 7, 2017, 10 pages.
(Continued)

*Primary Examiner* — Atique Ahmed

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method for operating a base station in a wireless communication system includes allocating a first resource to a first service, allocating a part of the first resource, as a second resource, to a second service, and transmitting indication information for the second resource.

23 Claims, 14 Drawing Sheets

(51) Int. Cl.
*H04L 27/26* (2006.01)
*H04W 72/12* (2009.01)

(52) U.S. Cl.
CPC .......... *H04L 5/0087* (2013.01); *H04L 5/0091* (2013.01); *H04L 27/2602* (2013.01); *H04W 72/1247* (2013.01); *H04W 72/1273* (2013.01); *H04W 72/1289* (2013.01)

(58) Field of Classification Search
CPC .......... H04W 72/1273; H04W 72/0446; H04L 5/0053; H04L 5/0007; H04L 5/0026; H04L 5/0035; H04L 5/0091; H04L 27/2602; H04L 5/0087; H04L 1/1812
See application file for complete search history.

(56) References Cited

U.S. PATENT DOCUMENTS

| | | | | |
|---|---|---|---|---|
| 2009/0310476 | A1* | 12/2009 | Seo | H04L 1/0071 370/203 |
| 2011/0188460 | A1* | 8/2011 | Malladi | H04W 52/146 370/329 |
| 2011/0201341 | A1* | 8/2011 | Choudhury | H04W 72/0426 455/450 |
| 2013/0010682 | A1* | 1/2013 | Kim | H04W 72/1289 370/315 |
| 2013/0028221 | A1* | 1/2013 | Seo | H04L 1/1861 370/329 |
| 2013/0195041 | A1* | 8/2013 | Papasakellariou | H04L 1/0038 370/329 |
| 2013/0301597 | A1* | 11/2013 | Kim | H04L 5/0048 370/329 |
| 2014/0044085 | A1* | 2/2014 | Hong | H04L 5/0037 370/329 |
| 2014/0073341 | A1* | 3/2014 | Nagata | H04W 52/38 455/452.1 |
| 2014/0204853 | A1* | 7/2014 | Ko | H04L 5/0035 370/329 |
| 2014/0269593 | A1 | 9/2014 | Wang et al. | |
| 2016/0330011 | A1* | 11/2016 | Lee | H04L 5/0066 |
| 2017/0164350 | A1* | 6/2017 | Sun | H04L 5/0007 |
| 2017/0171850 | A1* | 6/2017 | Ang | H04W 72/0406 |
| 2017/0201967 | A1* | 7/2017 | Yang | H04L 5/0073 |
| 2017/0208568 | A1* | 7/2017 | Nam | H04L 5/0094 |

OTHER PUBLICATIONS

3GPP TS 36.211 V8.9.0 (Dec. 2009), Technical Specification, 3rd Generation Partnership Project; Technical Specification Group Radio Access Network; Evolved Universal Terrestrial Radio Access (E-UTRA); Physical Channels and Modulation (Release 8), dated Dec. 2009, 83 pages.
3GPP TS 38.213 V15.2.0 (Jun. 2018), Technical Specification, 3rd Generation Partnership Project; Technical Specification Group Radio Access Network; NR; Physical layer procedures for control (Release 15), Jun. 2018, 99 pages.
KT Corp et al., "Discussion on NR numerology," R1-165525, 3GPP TSG RAN WG1 Meeting #85, Nanjing, China, May 23-27, 2016, 5 pages.
Nokia et al., "Punctured Scheduling for Low Latency Transmissions," R1-165381, 3GPP TSG-RAN WG1 #85, Nanjing, P.R. China, May 23-27, 2016, 4 pages.
Panasonic, "Discussion on the multiplexing of different numerologies," R1-164985, 3GPP TSG-RAN WG1 Meeting 85, Nanjing, China, May 23-27, 2016, 5 pages.
Samsung, "Multiplexing of eMBB and URLLC in Downlink," R1-1705407, 3GPP TSG RAN WG1 Meeting #88bis, Spokane, USA, Apr. 3-7, 2017, 7 pages.
ZTE Corporation et al., "Discussion on Control Channel Design for NR MIMO," R1-165038, 3GPP TSG RAN WG1 Meeting #85, Nanjing, China, May 23-27, 2016, 4 pages.

* cited by examiner

[Fig. 1]
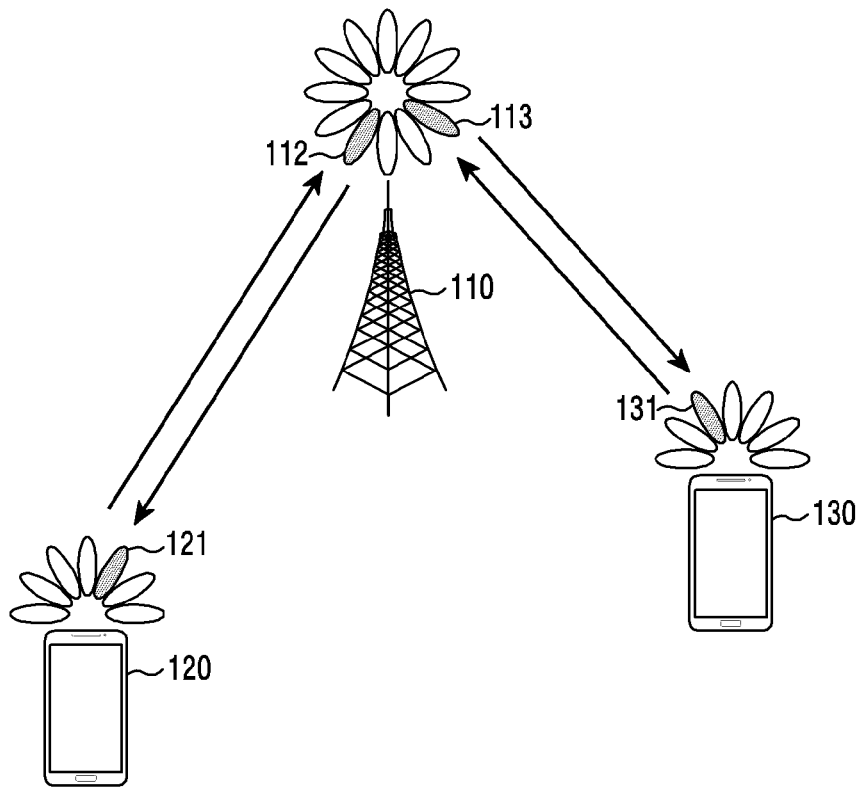
[Fig. 2]
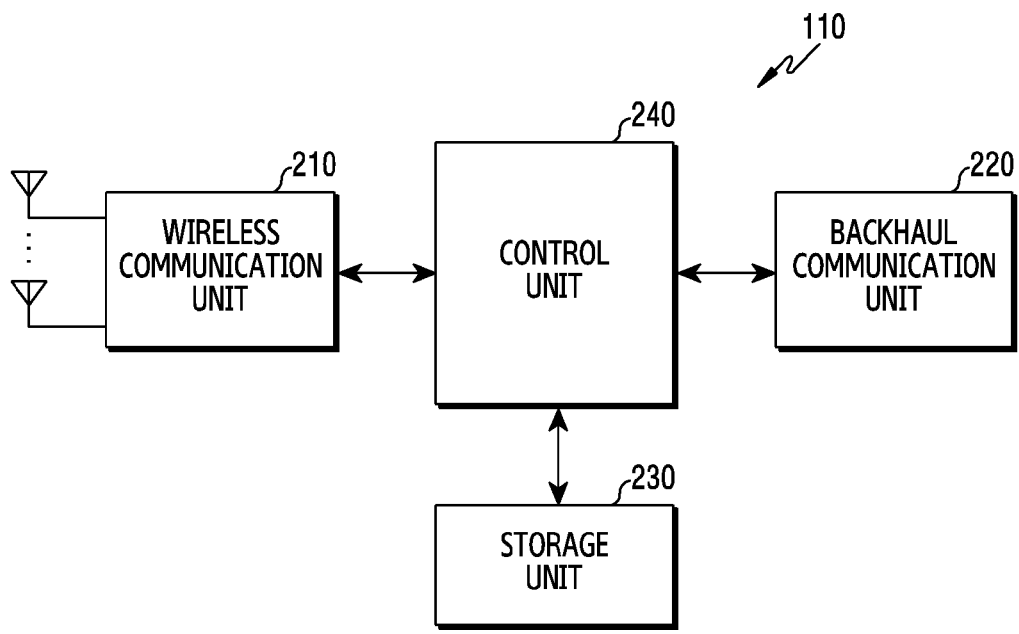

[Fig. 3]
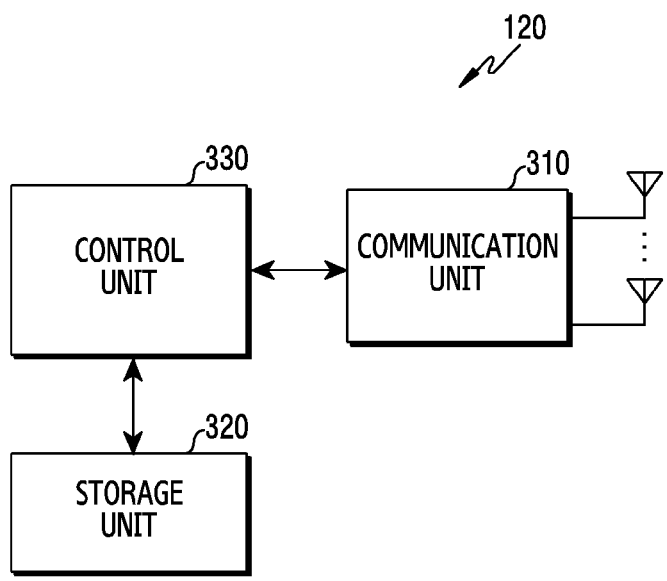
[Fig. 4]
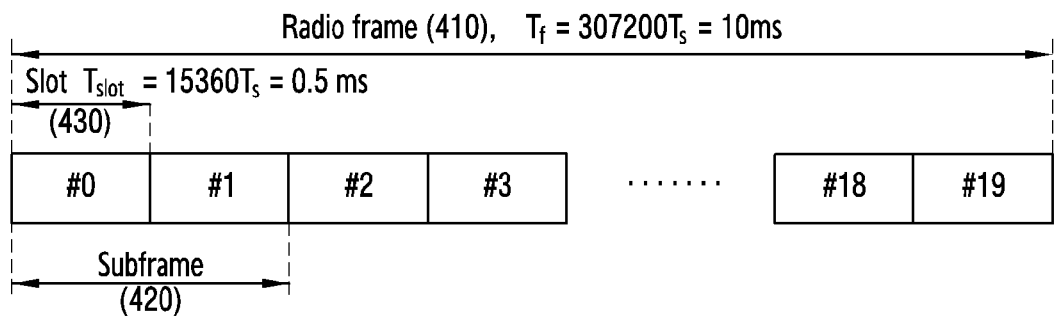

[Fig. 5]
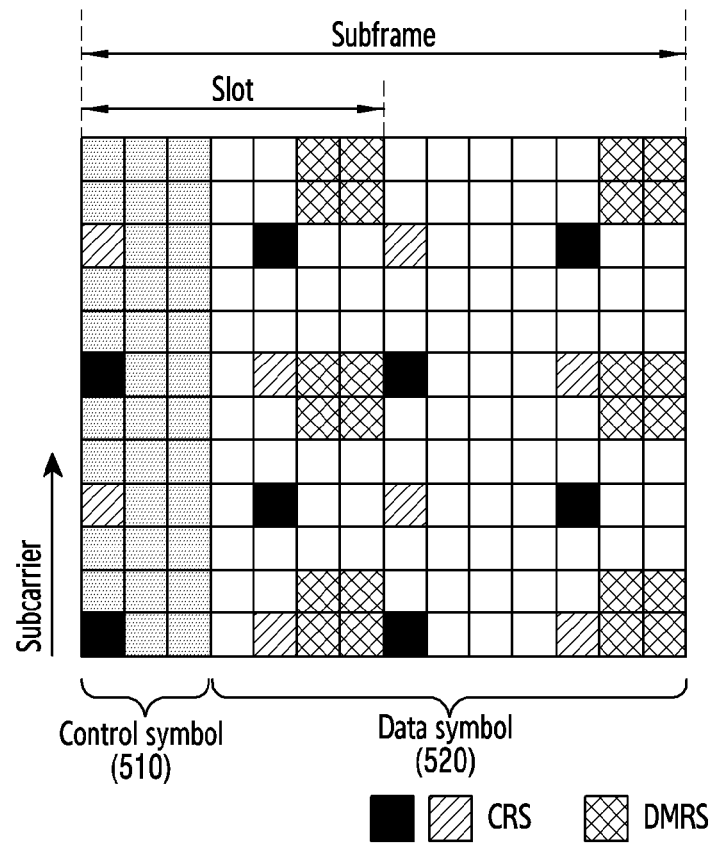
[Fig. 6A]
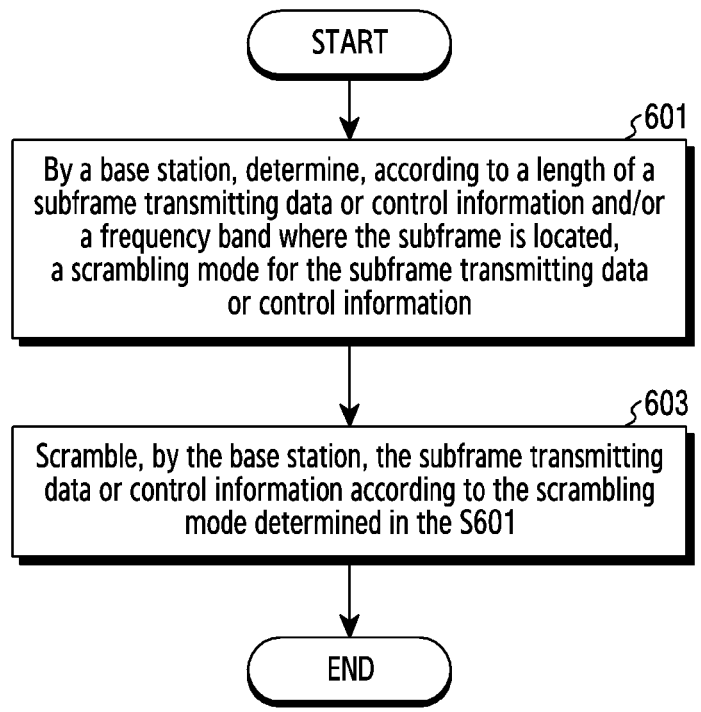

[Fig. 6B]
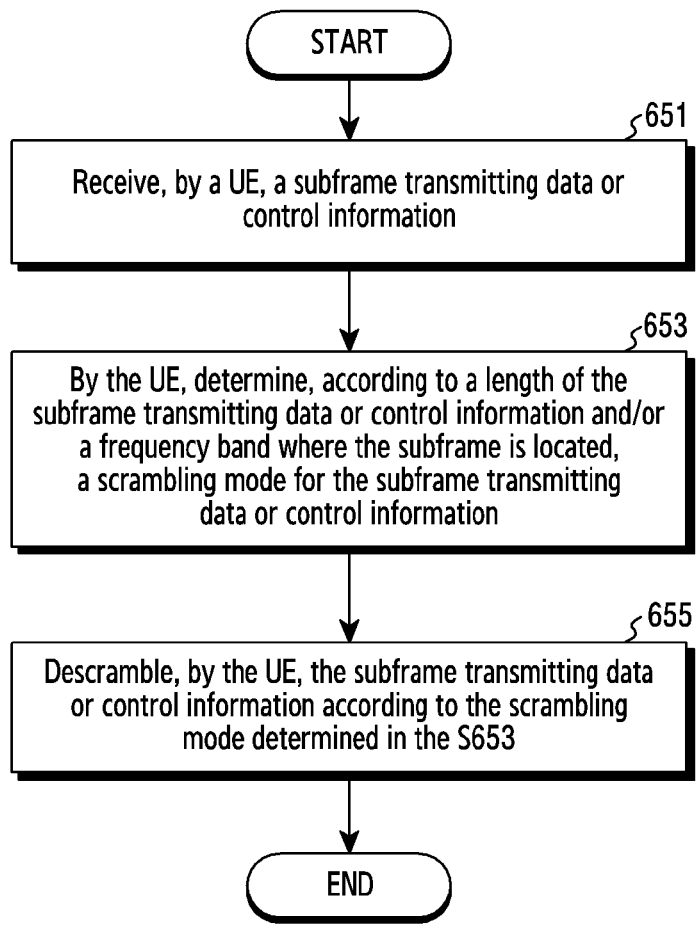

[Fig. 7]
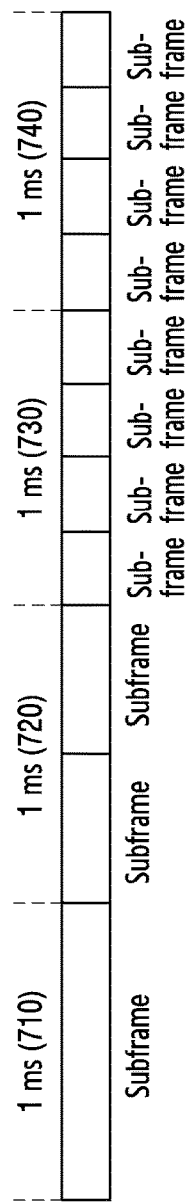
[Fig. 8]
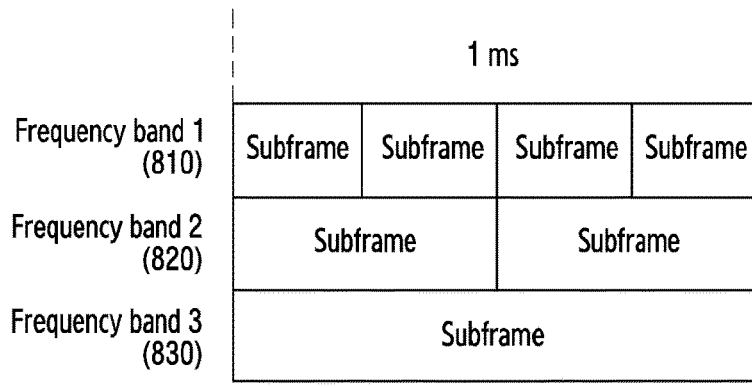

[Fig. 9]
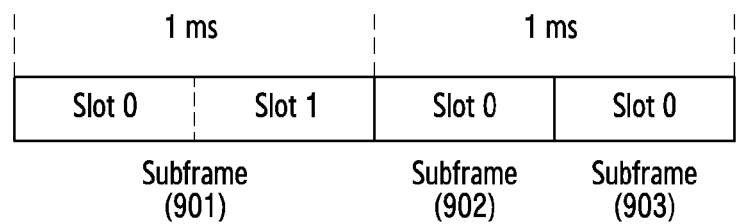
[Fig. 10]
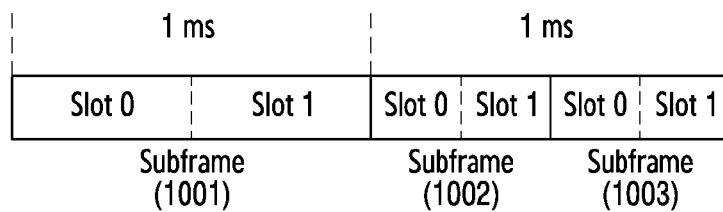

[Fig. 11]
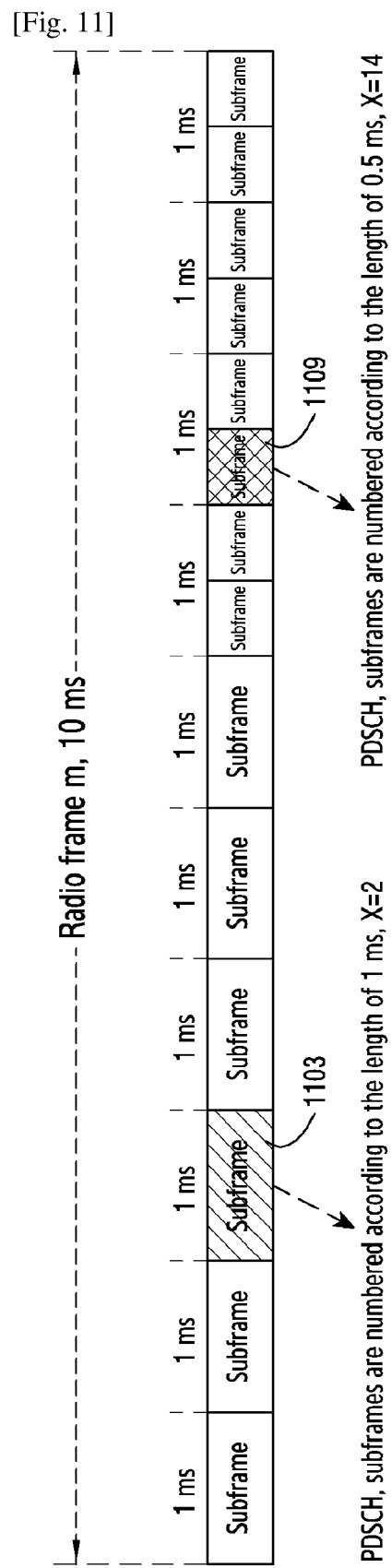

[Fig. 12]
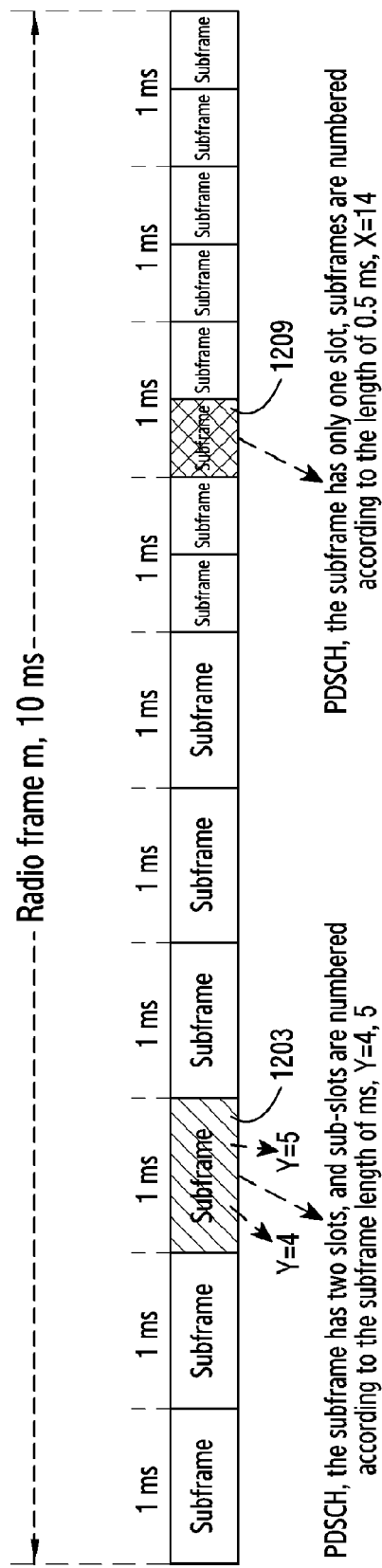

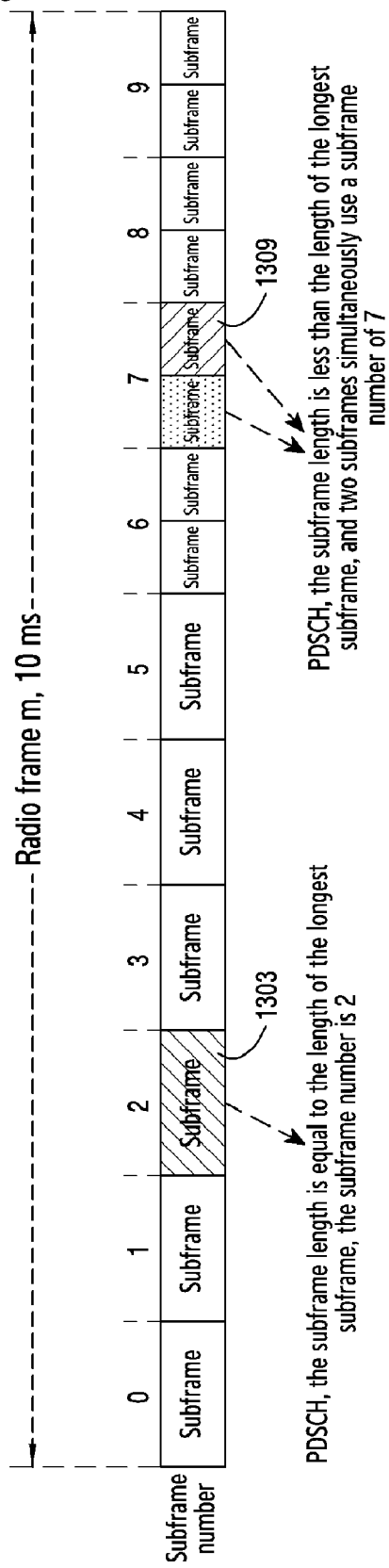
[Fig. 13]

[Fig. 14]
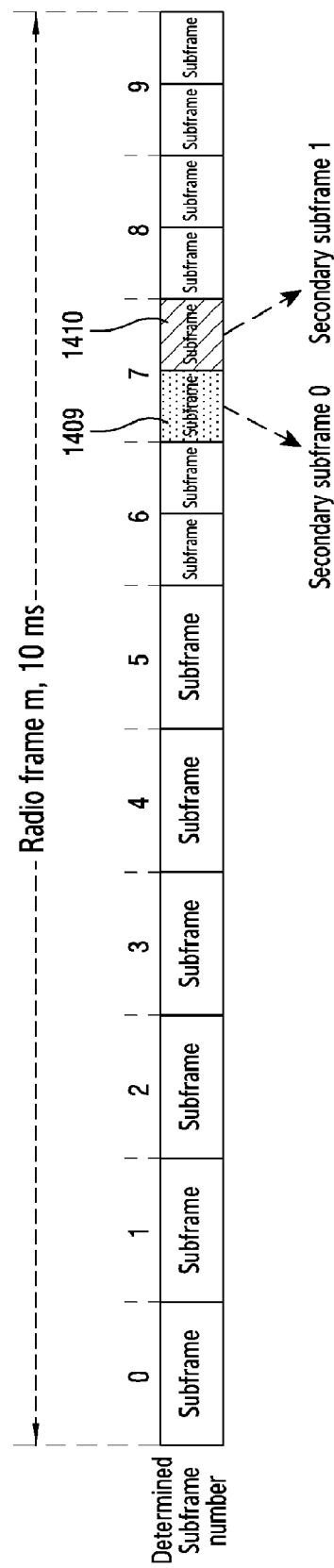

[Fig. 15]
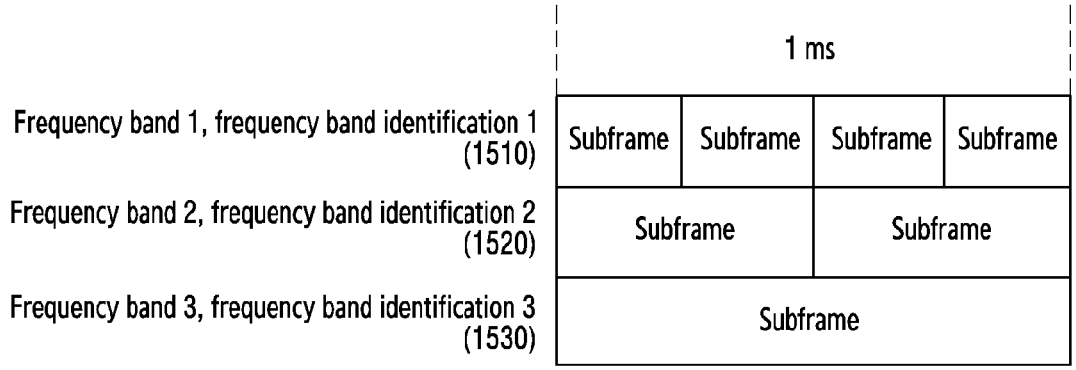
[Fig. 16]
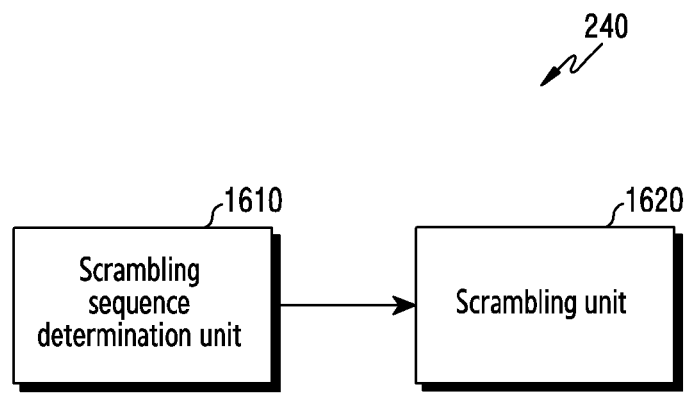
[Fig. 17]
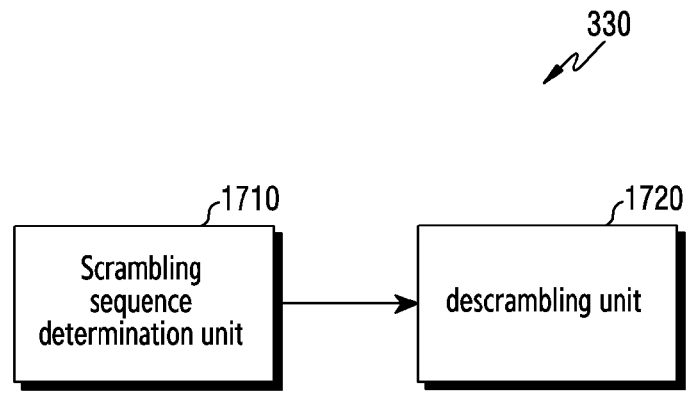

[Fig. 18]
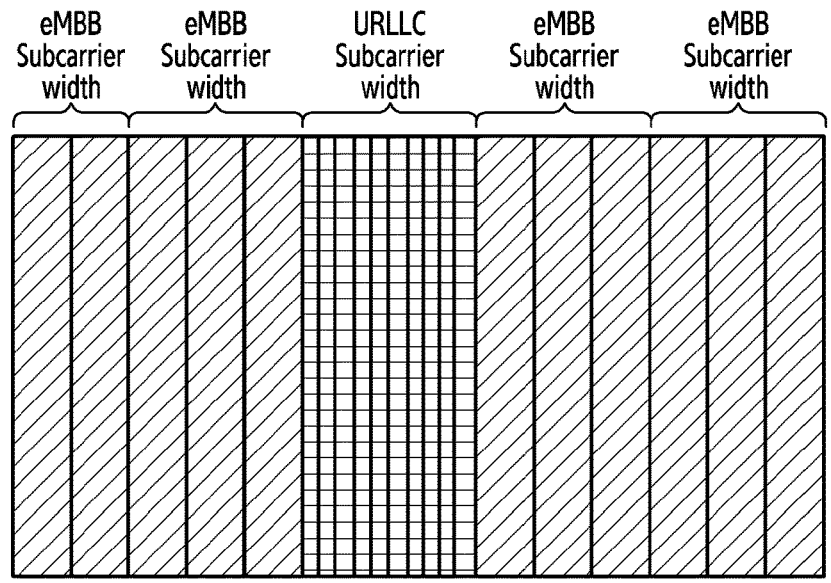
[Fig. 19A]
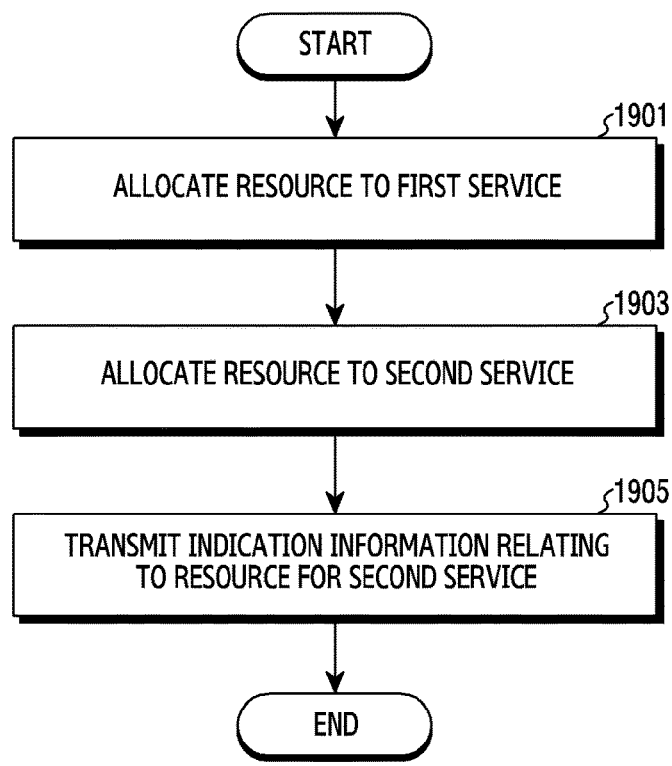

[Fig. 19B]
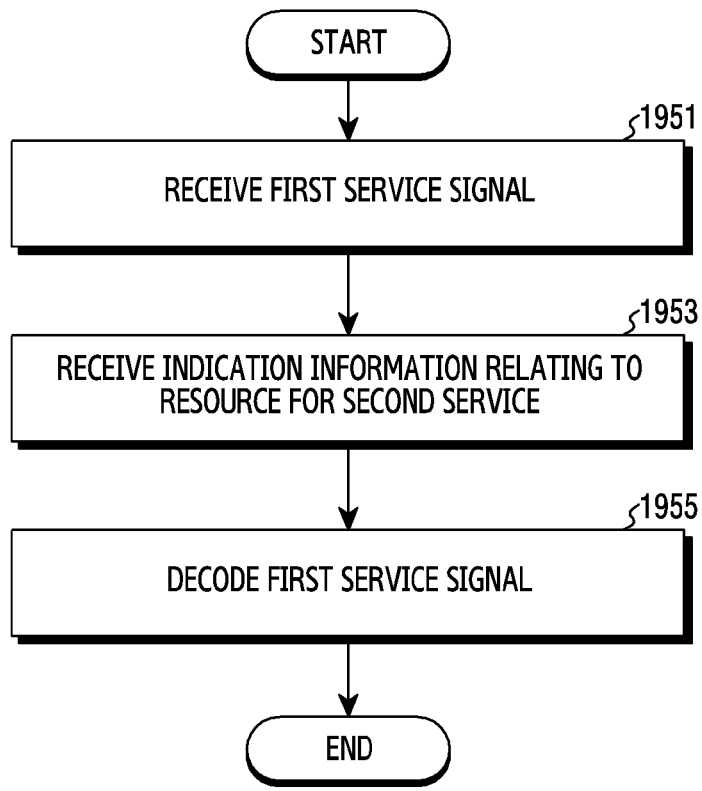
[Fig. 20A]
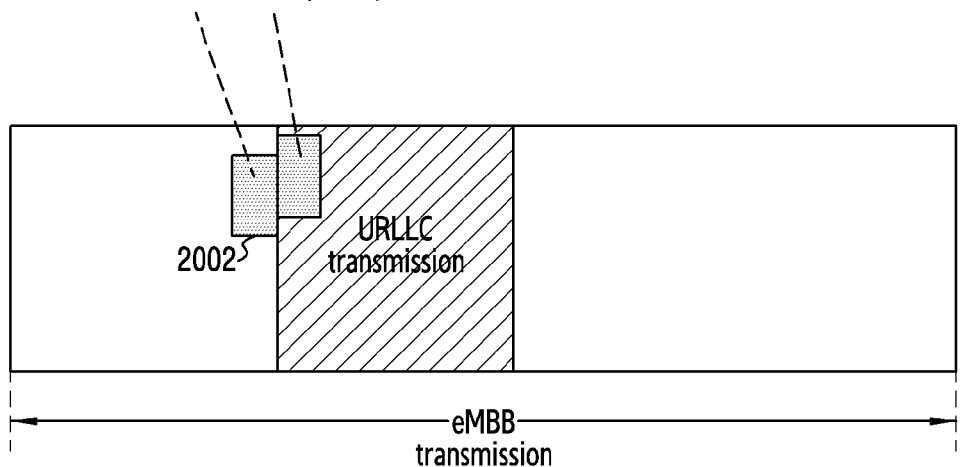

[Fig. 20B]
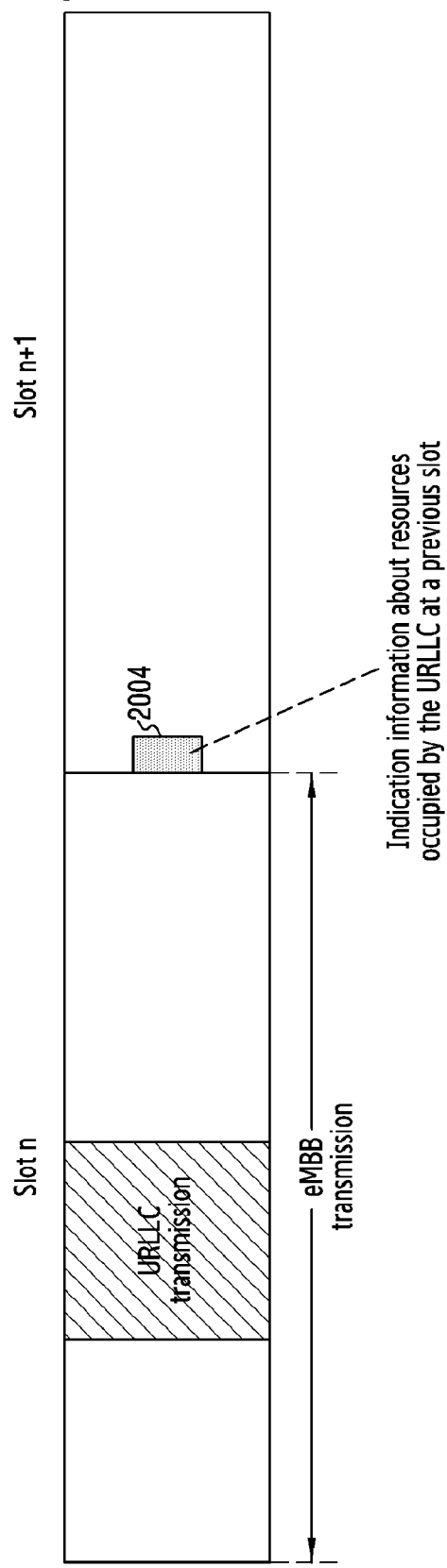

METHOD AND APPARATUS FOR TRANSMITTING DATA OR CONTROL INFORMATION IN WIRELESS COMMUNICATION SYSTEM

CROSS-REFERENCE TO RELATED APPLICATIONS

This application is a 371 National Stage of International Application No. PCT/KR2017/007722 filed on Jul. 18, 2017, which claims priority to Chinese Patent Application No. 201610565194.9 filed Jul. 18, 2016, Chinese Patent Application No. 201611109764.X filed Dec. 6, 2016, and Korean Patent Application No. 10-2017-0090917 filed Jul. 18, 2017, the disclosures of which are herein incorporated by reference in their entirety.

BACKGROUND

1. Field

The present disclosure generally relates to the a wireless communication system, and in particular to a method and apparatus for transmitting data and control information.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Based on the above description, the present disclosure provides an apparatus and method for effectively transmitting data and control information in a wireless communication system.

Further, the present disclosure provides an apparatus and method for notifying that a resource allocated to a first service has been punctured for a second service in a wireless communication system.

Further, the present disclosure provides an apparatus and method for notifying of a position of the resource punctured for the second service among resources allocated to the first service in a wireless communication system.

Further, the present disclosure provides an apparatus and method for scrambling and descrambling signals transmitted through subframes, to which various types of numerology are applied, in a wireless communication system.

In accordance with an aspect of the present disclosure, a method for operating a base station in a wireless communication system includes allocating a first resource to a first service, allocating a part of the first resource, as a second resource, to a second service, and transmitting indication information for the second resource.

In accordance with another aspect of the present disclosure, a method for operating a terminal in a wireless communication system includes receiving allocation information relating to a first resource for a first service, receiving a signal of the first service through the first resource, receiving indication information relating to a second resource for a second service, which occupies at least a part of an area indicated by the allocation information, and decoding the signal by using the indication information.

In accordance with another aspect of the present disclosure, a base station in a wireless communication system includes at least one processor configured to allocate a first resource to a first service, and allocate a part of the first resource, as a second resource, to a second service, and a transceiver configured to transmit indication information relating to the second resource.

In accordance with another aspect of the present disclosure, a terminal in a wireless communication system includes a transceiver configured to receive allocation information relating to a first resource for a first service, receive a signal of the first service through the first resource, and receive indication information relating to a second resource for a second service, which occupies at least a part of an area indicated by the allocation information, and at least one processor configured to decode the signal by using the indication information.

For this purpose, the present disclosure adopts the following technical solutions.

A method for scrambling data and control information is provided. For a system supporting different subframe lengths, the method comprises the following steps of:

determining, according to a length of a subframe transmitting data or control information and/or a frequency band where the subframe transmitting data or control information is located, a scrambling mode for the subframe transmitting data or control information; and scrambling and transmitting the subframe transmitting data or control information according to the determined scrambling mode.

Preferably, the step of determining the scrambling mode according to a length of a subframe transmitting data or control information comprises:

within a radio frame where the subframe transmitting data or control information is located, numbering all subframes or all slots by using a specified subframe length or a specified slot length as a numbering unit, determining an initial value of a scrambling sequence according to a subframe number or slot number of the subframe transmitting data or control information, and determining the scrambling sequence according to the initial value.

Preferably, when the specified subframe length is used as a numbering unit, the specified subframe length is a subframe length of the subframe transmitting data or control information.

Preferably, when the subframe transmitting data or control information comprises two slots, the specified slot length is used as a numbering unit, and the specified slot length is a slot length within the subframe transmitting data or control information; and when the subframe transmitting data or control information comprises only one slot, the specified subframe length is used as a numbering unit, and the specified subframe length is a subframe length of the subframe transmitting data or control information.

Preferably, when the specified subframe length is used as a numbering unit, the specified subframe length is a subframe length of the longest subframe or shortest subframe within the radio frame;

or, when the specified subframe length is used as a numbering unit, the specified subframe length is determined by a received higher-layer signaling or system information or by presetting.

Preferably, when the length of the subframe transmitting data or control information is greater than the specified subframe length, the determining an initial value of a scrambling sequence comprises: determining the initial value of the scrambling sequence according to the smallest one of a multiple of subframe numbers of the subframe transmitting data or control information.

Preferably, when the initial value of the scrambling sequence is determined according to a subframe number of the subframe transmitting data or control information, the way of determining the initial value $c_{init}$ of the scrambling sequence comprises: $c_{init}=n_{RNTI}\cdot 2^{14}+q\cdot 2^{13}+X\cdot 2^9+N_{ID}^{cell}$; and/or, when the initial value of the scrambling sequence is determined according to a slot number of the subframe transmitting data or control information, the way of determining the initial value $c_{init}$ of the scrambling sequence comprises: $c_{init}=n_{RNTI}\cdot 2^{14}+q\cdot 2^{13}+\lfloor Y/2 \rfloor \cdot 2^9+N_{ID}^{cell}$;

where $n_{RNTI}$ is an RNTI of a UE, q is the serial number of a codeword, X is the subframe number of the subframe transmitting data or control information, Y is the slot number of the subframe transmitting data or control information, and $N_{ID}^{cell}$ is an index of a serving cell.

Preferably, after numbering all subframes by using the specified subframe length as a numbering unit and before determining an initial value of the scrambling sequence, the method comprises: for a multiple of subframes with a same subframe number, performing secondary numbering according to an actual subframe length to obtain secondary subframe numbers; and, for subframes having a different subframe number from other subframes, setting the secondary subframe numbers of the subframes as 0; and the determining an initial value of a scrambling sequence comprises: determining the initial value of the scrambling sequence according to the subframe number and secondary subframe number of the subframe transmitting data or control information.

Preferably, the determining the initial value $c_{init}$ of the scrambling sequence according to the subframe number and the secondary subframe number comprises:

$$c_{init}=n_{RNTI}\cdot 2^{14}+q\cdot 2^{13}+X\cdot 2^9+Y'\cdot 2^M+N_{ID}^{cell};$$

where $n_{RNTI}$ is an RNTI of a UE, q is the serial number of a codeword, X is the subframe number of the subframe transmitting data or control information, Y' is the secondary subframe number of the subframe transmitting data or control information, M is a preset positive integer, and $N_{ID}^{cell}$ is an index of a serving cell.

Preferably, when the length of the subframe transmitting data or control information is smaller than the specified subframe length, the step of descrambling the subframe transmitting data or control information according to the scrambling mode comprises: descrambling by using the scrambling sequence c(i), where i starts from (n−1)P, n is the serial number of the subframe transmitting data or control information among a multiple of subframes with a same subframe number, and P is a positive integer.

Preferably, the P is a positive integer configured by a higher-layer signaling or by presetting, or the number of bits transmitted within a shortened subframe in a highest-order modulation and coding mode within a system bandwidth is used as P.

Preferably, the step of determining the scrambling mode according to a frequency band where the subframe transmitting data or control information is located comprises: determining an initial value of a scrambling sequence according to a frequency band index of the frequency band where the subframe transmitting data or control information is located, and determining the scrambling sequence according to the initial value.

Preferably, the determining an initial value $c_{init}$ of a scrambling sequence according to a frequency band index of the frequency band where the subframe transmitting data or control information is located is:

$$c_{init}=c_{init}'+B_{ID} \text{ or } c_{init}=c_{init}'+B_{ID}\cdot 2^N \text{ or}$$

$$c_{init}=n_{RNTI}\cdot 2^{14}+q\cdot 2^{13}+\lfloor n_s/2 \rfloor \cdot 2^9+B_{ID}+N_{ID}^{cell} \text{ or}$$

$$c_{init}=n_{RNTI}\cdot 2^{14}+q\cdot 2^{13}+\lfloor n_s/2 \rfloor \cdot 2^9+B_{ID}\cdot 2^N+N_{ID}^{cell},$$

where the $c_{init}'$ is the initial value of the scrambling sequence determined according to the subframe number of the subframe transmitting data or control information, $n_{RNTI}$ is an RNTI of a UE, q is the serial number of a codeword, $N_{ID}^{cell}$ is an index of a serving cell, $B_{ID}$ is the frequency band index of the frequency band where the subframe transmitting data or control information is located, and the N is a preset positive integer.

A method for descrambling data and control information is provided. For a system supporting different subframe lengths, the method comprises the following steps of:

receiving a subframe transmitting data or control information;

determining, according to a length of the subframe transmitting data or control information and/or a frequency band where the subframe transmitting data or control information is located, a scrambling mode for the subframe transmitting data or control information; and descrambling the subframe transmitting data or control information according to the determined scrambling mode.

Preferably, the step of determining the scrambling mode according to a length of the subframe transmitting data or control information comprises:

within a radio frame where the subframe transmitting data or control information is located, numbering all subframes or all slots by using a specified subframe length or a specified slot length as a numbering unit, determining an initial value of a scrambling sequence according to a subframe number or slot number of the subframe transmitting data or control information, and determining the scrambling sequence according to the initial value.

Preferably, when the specified subframe length is used as a numbering unit, the specified subframe length is a subframe length of the subframe transmitting data or control information.

Preferably, when the subframe transmitting data or control information comprises two slots, the specified slot length is used as a numbering unit, and the specified slot length is a slot length within the subframe transmitting data or control information; and when the subframe transmitting data or control information comprises only one slot, the specified subframe length is used as a numbering unit, and the specified subframe length is a subframe length of the subframe transmitting data or control information.

Preferably, when the specified subframe length is used as a numbering unit, the specified subframe length is a subframe length of the longest subframe or shortest subframe within the radio frame;

or, when the specified subframe length is used as a numbering unit, the specified subframe length is determined by a received higher-layer signaling or system information or by presetting.

An equipment for scrambling data and control information is provided. For a system supporting different subframe lengths, the equipment comprises: a scrambling sequence determination unit and a scrambling unit;

the scrambling sequence determination unit is configured to determine, according to a length of a subframe transmitting data or control information and/or a frequency band where the subframe transmitting data or control information is located, a scrambling mode for the subframe transmitting data or control information; and the scrambling unit is configured to scramble and transmit the subframe transmitting data or control information according to the determined scrambling mode.

An equipment for descrambling data and control information is provided. For a system supporting different subframe lengths, the equipment comprises: a scrambling sequence determination unit and a descrambling unit;

the scrambling sequence determination unit is configured to receive a subframe transmitting data or control information, and determine, according to a length of the subframe transmitting data or control information and/or a frequency band where the subframe transmitting data or control information is located, a scrambling mode for the subframe transmitting data or control information; and the descrambling unit is configured to descramble the subframe transmitting data or control information according to the determined scrambling mode for the subframe transmitting data or control information.

A method for indicating occupancy of resources is provided. For a system for multiplexing an enhanced bandwidth and an ultra-reliable low delay, the method comprises the following steps of:

determining, according to the received indication information about resources occupied by an ultra-reliable low-delay transmission, resources occupied by the ultra-reliable low-delay transmission in a frequency domain and a time domain; and preferably, determining, according to the determined resources occupied by the ultra-reliable low-delay transmission in the frequency domain and the time domain, a method for receiving eMBB data and reference symbols.

Preferably, the indication information about the resources occupied by the ultra-reliable low-delay transmission can be transmitted by public downlink control information, or the indication information about the resources occupied by the ultra-reliable low-delay transmission can be transmitted by a UE-group DCI.

Preferably, the indication information about the resources occupied by the ultra-reliable low-delay transmission is transmitted by a mini-slot transmitting a URLLC; or, the indication information about the resources occupied by the ultra-reliable low-delay transmission is transmitted by a mini-slot before transmitting the URLLC; or, for the indication information about the resources occupied by the ultra-reliable low-delay transmission, the indication information about the resources occupied by the URLLC is transmitted before a first slot after a current eMBB slot.

The indication of the resources occupied by the URLLC comprises:

when physical resources occupied by the URLLC are continuous, the resources occupied by the URLLC can be determined by indicating a starting position of physical resource blocks occupied by the URLLC and indicating the number of physical resource blocks occupied by the URLLC;

preferably, when physical resources occupied by the URLLC are discrete, physical resource blocks occupied by the URLLC can be indicated by bit mapping;

preferably, when the URLLC and eMBB adopt different subcarrier spaces, the physical resources occupied by the URLLC are continuous;

preferably, when the URLLC and the eMBB adopt a same subcarrier space, the physical resources occupied by the URLLC can be continuous or discrete, which is configured by a higher-layer signaling or preset by a protocol; and preferably, whether an eMBB slot is occupied by the URLLC is indicated by 1-bit indication information.

A method for indicating occupancy of resources is provided. For a system for multiplexing a first type of services and a second type of services, the method comprises the following steps of:

determining, according to the received indication information indicative of resources occupied by transmitting the second type of services, resources occupied by transmitting the second type of services in a frequency domain and a time domain; and preferably, determining, according to the determined resources occupied by transmitting the second type of services in the frequency domain and the time domain, a method for receiving data and/or reference symbols of the first type of services.

Preferably, the first type of services are enhanced broadband services, and the second type of services are ultra-reliable low-delay services.

Preferably, the indication information is transmitted by public downlink control information, or the indication information is transmitted by downlink control information shared by a group of users.

Preferably, the indication information is transmitted by a mini-slot in which the second type of services are transmitted, or the indication information is transmitted by a mini-slot before transmitting the second type of services, or the indication information is transmitted by first k OFDM symbols of a first slot following a current slot for the first type of services; or, the indication information is transmitted by a mini-slot transmitting the second type of services.

Preferably, the first k OFDM symbols are reserved for transmitting a control signaling, and the k is configured by a higher-layer signaling or determined by presetting.

Preferably, the resources occupied by the second type of services are indicated in at least one of the following ways:

preferably, when physical resources occupied by the second type of services are continuous, the resources occupied by the second type of services are determined by indicating a starting position of physical resource blocks occupied by the second type of services and indicating the number of physical resource blocks occupied by the second type of services;

preferably, when the physical resources occupied by the second type of services are discrete, physical resource blocks occupied by the second type of services are indicated by bit mapping;

preferably, when the second type of services and the first type of services adopt different subcarrier spaces, the physical resources occupied by the second type of services are continuous;

preferably, when the second type of services and the first type of services adopt a same subcarrier space, the physical resources occupied by the second type of services can be continuous or discrete, which is configured by a higher-layer signaling or preset by a protocol; and preferably, whether a slot for the first type of services is occupied by the second type of services is indicated by 1-bit indication information.

An equipment for indicating occupancy of resources is provided. For a system for multiplexing a first type of services and a second type of services, the equipment comprises a resource determination unit and a receiving unit:

the resource determination unit is configured to determine, according to the received indication information indicative of resources occupied by transmitting the second type of services, resources occupied by transmitting the second type of services in a frequency domain and a time domain; and the receiving unit is configured to determine, according to the determined resources occupied by transmitting the second type of services in the frequency domain and the time domain, a method for receiving data and/or reference symbols of the first type of services.

It can be seen from the technical solutions that, in the present invention, for the transmitting side, a scrambling mode for a subframe transmitting data or control information is determined according to a length of the subframe transmitting data or control information and/or a frequency band where the subframe transmitting data or control information is located; and, the subframe transmitting data or control information is scrambled and transmitted according to the determined scrambling mode. For the receiving side, a subframe transmitting data or control information is received, and a scrambling mode for the subframe transmitting data or control information is determined according to a length of the subframe transmitting data or control information and/or a frequency band where the subframe transmitting or control information is located; and, the subframe transmitting data or control information is descrambled according to the determined scrambling mode. In this way, subframes of different lengths are numbered according to a unified length unit, thereby realizing scrambling or descrambling.

An apparatus and method according to various embodiments of the present disclosure enables data and control information to be efficiently scrambled by considering a subframe length in a system in which various types of numerology coexist.

Further, an apparatus and method according to various embodiments of the present disclosure enables data to be properly decoded by notifying of puncturing of a resource in a system in which two or more services having different characteristics are supported.

The effects obtainable by the present disclosure are not limited to the above-mentioned effects, and other effects not mentioned herein will be clearly understood by those skilled in the art from the following description.

BRIEF DESCRIPTION OF THE DRAWINGS

FIG. 1 illustrates a wireless communication system according to various embodiments of the present disclosure;

FIG. 2 illustrates a configuration of a base station in a wireless communication system according to various embodiments of the present disclosure;

FIG. 3 illustrates a configuration of a terminal in a wireless communication system according to various embodiments of the present disclosure;

FIG. 4 illustrates a frequency division duplex (FDD) frame structure in a wireless communication system;

FIG. 5 illustrates an example of a subframe structure in a wireless communication system;

FIG. 6A illustrates a flow diagram for scrambling by a base station in a wireless communication system according to various embodiments of the present disclosure;

FIG. 6B illustrates a flow diagram for descrambling by a terminal in a wireless communication system according to various embodiments of the present disclosure;

FIG. 7 illustrates an apparatus that performs scheduling for uplink and downlink resources in a wireless communication system according to various embodiments of the present disclosure;

FIG. 8 illustrates different subframe lengths on different frequency bands in a wireless communication system according to various embodiments of the present disclosure;

FIG. 9 illustrates different subframes including a different number of slots in a wireless communication system according to various embodiments of the present disclosure;

FIG. 10 illustrates different subframe lengths in a wireless communication system according to various embodiments of the present disclosure;

FIG. 11 illustrates method 1 of a first embodiment in a wireless communication system according to various embodiments of the present disclosure;

FIG. 12 illustrates method 2 of the first embodiment in a wireless communication system according to various embodiments of the present disclosure;

FIG. 13 illustrates method 3 and method 5 of the first embodiment in a wireless communication system according to various embodiments of the present disclosure;

FIG. 14 illustrates method 4 and method 6 of the first embodiment in a wireless communication system according to various embodiments of the present disclosure;

FIG. 15 illustrates a second embodiment in a wireless communication system according to various embodiments of the present disclosure;

FIG. 16 illustrates a configuration of an apparatus for scrambling in a wireless communication system according to various embodiments of the present disclosure;

FIG. 17 illustrates a configuration of an apparatus for descrambling in a wireless communication system according to various embodiments of the present disclosure;

FIG. 18 illustrates a third embodiment in a wireless communication system according to various embodiments of the present disclosure;

FIG. 19A illustrates a flow diagram showing an operation of a base station in a wireless communication system according to various embodiments of the present disclosure;

FIG. 19B illustrates a flow diagram showing an operation of a terminal in a wireless communication system according to various embodiments of the present disclosure;

FIG. 20A illustrates indication information for resources occupied by a service provided based on a preemption-based multiplexing scheme in a wireless communication system according to various embodiments of the present disclosure; and FIG. 20B illustrates another piece of indication information for resources occupied by a service provided based on a preemption-based multiplexing scheme in a wireless communication system according to various embodiments of the present disclosure.

DETAILED DESCRIPTION

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meanings as those commonly understood by a person skilled in the art to which the present disclosure pertains. Such terms as those defined in a generally used dictionary may be interpreted as having the meanings equal to the contextual meanings in the relevant field of art, and are not to be interpreted as having ideal or excessively formal meanings unless clearly defined in the present disclosure. In some cases, even terms defined in the present disclosure should not be interpreted as excluding embodiments of the present disclosure.

Hereinafter, various embodiments of the present disclosure will be described from the perspective of hardware. However, various embodiments of the present disclosure include a technology that uses both hardware and software, and thus the various embodiments of the present disclosure may not exclude the perspective of software.

Hereinafter, the present disclosure relates to an apparatus and method for transmitting data and control information in a wireless communication system. Specifically, the present disclosure describes a technique for supporting a mixed numerology in a wireless communication system.

Terms used in the following descriptions, such as a term referring to variables that determine physical attributes configuring a frame, a term referring to a signal, a term referring to a channel, a term referring to control information, a term referring to network entities, and a term referring to an element of a device, are used for convenience of explanation. Accordingly, the present disclosure is not limited to the following terms, and other terms having an equivalent technical meaning may be used.

Further, the present disclosure describes various embodiments using terms used in some communication standards (e.g., 3rd Generation Partnership Project (3GPP)), but this merely corresponds to an example for explanation. Various embodiments of the present disclosure may be easily modified and applied to other communication systems as well.

FIG. 1 illustrates a wireless communication system according to various embodiments of the present disclosure. FIG. 1 illustrates a base station 110, a terminal 120, and a terminal 130, as a part of nodes using a wireless channel in a wireless communication system. FIG. 1 illustrates only one base station, but may further include another base station that is identical or similar to the base station 110.

The base station 110 is a network infrastructure that provides the terminals 120 and 130 with wireless access. The base station 110 has a coverage defined by a predetermined geographic area based on the distance over which a signal may be transmitted. The base station 110 may be referred to as an "access point (AP)", an "eNodeB (eNB)", a "5th generation node (5G node)", a "wireless point", a "transmission/reception point (TRP)", or other terms having an equivalent technical meaning.

Each of the terminal 120 and the terminal 130 is an apparatus used by a user, and performs communication with the base station 110 through a wireless channel. In some cases, at least one of the terminal 120 and the terminal 130 may be operated without user involvement. That is, at least one of the terminal 120 and the terminal 130 is an apparatus that performs machine-type communication (MTC), and may not be carried by a user. Each of the terminal 120 and the terminal 130 may be referred to as a "user equipment (UE)", a "mobile station", a "subscriber station", a "remote terminal", a "wireless terminal", a "user device", or other terms having an equivalent technical meaning.

The base station 110, the terminal 120, and the terminal 130 may transmit and receive a radio signal in a millimeter wave (mmWave) band (e.g., 28 GHz, 30 GHz, 38 GHz, or 60 GHz). At this time, in order to improve a channel gain, the base station 110, the terminal 120, and the terminal 130 may perform beamforming. Here, the beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 through a beam search or a beam management procedure. After the serving beams 112, 113, 121, and 131 are selected, subsequent communication may be performed through a resource in a quasi co-located (QCL) relationship with a resource for transmission of the serving beams 112, 113, 121, and 131.

FIG. 2 illustrates a configuration of a base station in a wireless communication system according to various embodiments of the present disclosure. The configuration illustrated in FIG. 2 may be understood as a configuration of the base station 110. The terms " . . . unit", " . . . device", etc. used below refer to a unit for processing at least one function or operation, and may be implemented as hardware, software, or a combination of hardware and software.

Referring to FIG. 2, the base station may include a wireless communication unit 210, a backhaul communication unit 220, a storage unit 120, and a control unit 240.

The wireless communication unit 210 performs functions for transmitting or receiving a signal through a wireless channel. For example, the wireless communication unit 210 performs conversion between a baseband signal and a bit string according to the physical layer standard of the system. For example, when data is transmitted, the wireless communication unit 210 generates complex symbols by encoding and modulating a transmission bit string. Further, when data is received, the wireless communication unit 210 restores a reception bit string by demodulating and decoding a baseband signal. In addition, the wireless communication unit 210 up-converts a baseband signal to a radio frequency (RF) band signal, transmits the up-converted signal through an antenna, and down-converts an RF band signal received through the antenna to a baseband signal.

To this end, the wireless communication unit 210 may include a transmission filter, a reception filter, an amplifier, a mixer, an oscillator, a digital to analog converter (DAC), an analog to digital converter (ADC), and the like. In addition, the wireless communication unit 210 may include a plurality of transmission/reception paths. Further, the wireless communication unit 210 may include at least one antenna array including a plurality of antenna elements. In terms of hardware, the wireless communication unit 210 may include a digital unit and an analog unit, and the analog unit may include a plurality of sub-units according to an operation power, an operation frequency, and the like.

As described above, the wireless communication unit 210 transmits and receives a signal. Accordingly, all or a part of the wireless communication unit 210 may be referred to as a "transmission unit", a "reception unit", or a "transceiver". In addition, in the following description, the meaning of transmission and reception performed through a wireless channel includes performing of processing, such as that described above, by the wireless communication unit 210.

The backhaul communication unit 220 provides an interface for performing communication with other nodes within a network. That is, the backhaul communication unit 220 converts a bit string transmitted from the base station to another node, for example, another access node, another base station, an upper node, a core network, etc., into a physical signal, and converts a physical signal received from another node into a bit string.

The storage unit 230 stores data, such as a basic program for operation of the base station, an application program, and configuration information. The storage unit 230 may include a volatile memory, a nonvolatile memory, or a combination of a volatile memory and a nonvolatile memory. Further, the storage unit 230 provides stored data in response to a request from the control unit 240.

The control unit 240 controls the overall operation of the base station. For example, the control unit 240 transmits and receives a signal through the wireless communication unit 210 or through the backhaul communication unit 220. In addition, the control unit 240 records data in the storage unit 230 and reads the data. Further, the control unit 240 may perform functions of a protocol stack required by the communication standard. To this end, the control unit 240 may include at least one processor.

According to various embodiments, the control unit 240 scrambles data or control information. At this time, the control unit 240 may determine a scrambling mode for a subframe that transmits data or control information, according to a length of the subframe and a frequency band in which the subframe is positioned. In addition, the control unit 240 may perform control to allocate a first resource for a first service, allocate a part of the first resource as a second resource for a second service, and transmit indication information for the second resource. For example, the control unit 240 may control the base station to perform operations according to various embodiments described below.

FIG. 3 illustrates a configuration of a terminal in a wireless communication system according to various embodiments of the present disclosure. The configuration illustrated in FIG. 3 may be understood as a configuration of the terminal 120. The terms " . . . unit", " . . . device", etc. used below refer to a unit for processing at least one function or operation, and may be implemented as hardware, software, or a combination of hardware and software.

Referring to FIG. 3, the terminal includes a communication unit 310, a storage unit 320, and a control unit 330.

The communication unit 310 performs functions for transmitting or receiving a signal through a wireless channel. For example, the communication unit 310 performs conversion between a baseband signal and a bit string according to the physical layer standard of the system. For example, when data is transmitted, the communication unit 310 generates complex symbols by encoding and modulating a transmission bit string. Further, when data is received, the communication unit 310 restores a reception bit string by demodulating and decoding a baseband signal. In addition, the communication unit 310 up-converts a baseband signal to an RF band signal, transmits the up-converted signal through an antenna, and down-converts an RF band signal received through the antenna to a baseband signal. For example, the communication unit 310 may include a transmission filter, a reception filter, an amplifier, a mixer, an oscillator, a DAC, an ADC, and the like.

In addition, the communication unit 310 may include a plurality of transmission/reception paths. Further, the communication unit 310 may include at least one antenna array including a plurality of antenna elements. In terms of hardware, the communication unit 310 may include a digital circuit and an analog circuit (e.g., a radio frequency integrated circuit (RFIC)). Here, the digital circuit and the analog circuit may be implemented as a single package. In addition, the communication unit 310 may include a plurality of RF chains. Furthermore, the communication unit 310 may perform beamforming.

As described above, the communication unit 310 transmits and receives a signal. Accordingly, all or a part of the communication unit 310 may be referred to as a "transmission unit", a "reception unit", or a "transceiver". In addition, in the following description, the meaning of transmission and reception performed through a wireless channel includes performing of processing, such as that described above, by the communication unit 310.

The storage unit 320 stores data, such as a basic program for operation of the terminal, an application program, and configuration information. The storage unit 320 may include a volatile memory, a nonvolatile memory, or a combination of a volatile memory and a nonvolatile memory. Further, the storage unit 320 provides stored data in response to a request from the control unit 330.

The control unit 330 controls the overall operation of the terminal. For example, the control unit 330 transmits and receives a signal through the communication unit 310. In addition, the control unit 330 records data in the storage unit 320 and reads the data. Further, the control unit 330 may perform functions of a protocol stack required by the communication standard. To this end, the control unit 330 may include at least one processor or a microprocessor, or may be part of a processor. Further, the control unit 330 and a part of the communication unit 310 may be referred to as a communication processor (CP).

According to various embodiments, the control unit 330 descrambles data or control information. At this time, the control unit 330 may determine a scrambling mode for a subframe that transmits data or control information, according to a length of the subframe and a frequency band in which the subframe is positioned. In addition, the control unit 330 may perform control to receive allocation information for a first resource for a first service, receive a signal of the first service through the first resource, receive indication information relating to a second resource for a second service, which occupies at least a part of an area indicated by the allocation information, and decode the signal by using the indication information. For example, the control unit 330 may control the terminal to perform operations according to various embodiments described below.

In a Long Term Evolution Advanced (LTE-A) system, each radio frame is 10 ms in length and equally divided into 10 subframes. A downlink Transmission Time Interval (TTI) is defined on one subframe.

FIG. 4 illustrates a frequency division duplex (FDD) frame structure in a wireless communication system. FIG. 4 shows a schematic diagram of a frame structure of a FDD system, where each downlink subframe 420 comprises two slots 430; for a normal cyclic prefix (CP) length, each slot contains seven orthogonal frequency division multiplexing (OFDM) symbols; while for an expanded CP length, each slot contains six OFDM symbols. Each radio frame 410 is 10 ms in length, contains 20 slots each having a length of 0.5 ms, and contains 10 subframes each having a length of 1 ms.

FIG. 5 illustrates an example of a subframe structure in a wireless communication system.

Referring FIG. 5, first n OFDM symbols 510 (n is equal to 1, 2 or 3) are used for transmitting Downlink Control Information (DCI), including a Physical Downlink Control Channel (PDCCH) and other control information; and the remaining OFDM symbols 520 are used for transmitting a Physical Downlink Shared Channel (PDSCH).

The basic granularity for resource allocation is a Physical Resource Block (PRB) pair. One PRB contains 12 continuous subcarriers in terms of frequency, and corresponds to one slot in terms of time. Two PRBs within two slots on a same subcarrier in a subframe are called a PRB pair. Within each PRB pair, each Resource Element (RE) is the smallest unit of time-frequency resources. In other words, each RE is a subcarrier in terms of frequency, and is an OFDM symbol in terms of time. REs can be used for different functions. For example, some REs can be used for transmitting a Cell-specific Reference Signal (CRS), a user-specific Demodulation Reference Signal (DMRS), a Channel State Information-Reference Signal (CSI-RS), a physical downlink control channel, a physical downlink shared channel, or more.

For each codeword q of the PDSCH, a scrambling operation is performed on a bit sequence $b^{(q)}(0), \ldots, b^{(q)}(M_{bit}^{(q)}-1)$ of transmission blocks transmitted within each subframe before modulation, where $M_{bit}^{(q)}$ is the number of bits of the codeword q. The specific scrambling operation is performed according to the following Equation 1:

$$\tilde{b}^q(i) = (b^q(i) + c^q(i)) \bmod 2 \qquad \text{Equation 1}$$

where $\tilde{b}^{(q)}(0), \ldots, \tilde{b}^{(q)}(M_{bit}^{(q)}-1)$ is the scrambled sequence, mod is a modulo operation, and $c^q(i)$ is a scrambling sequence. A method for generating the scrambling sequence refers to Section 7.2 of the protocol 3GPP TS 36.211 V8.9.0 (2009 December). An initial value generated by the scrambling sequence is as Equation 2 below.

$$c_{init} = n_{RNTI} \cdot 2^{14} + q \cdot 2^{13} + \lfloor n_s/2 \rfloor \cdot 2^9 + N_{ID}^{cell} \qquad \text{Equation 2}$$

where $n_{RNTI}$ is a Radio Network Temporary Identifier (RNTI) of a UE, $n_s$ is the serial number of a slot, $N_{ID}^{cell}$ is an index of a serving cell, and q is the serial number of the codeword.

At present, it is possible to have a multiple of subframes of different lengths in a same communication system, so it is necessary to further discuss specific scrambling and descrambling modes in such a system.

Hereafter, the present disclosure describes various embodiments for scrambling and descrambling data or control information, wherein the scrambling method corresponds to the descrambling method, specifically as shown in FIG. 6A and FIG. 6B.

FIG. 6A illustrates a flow diagram for scrambling by a base station in a wireless communication system according to various embodiments of the present disclosure. FIG. 6A exemplifies a method for operating the base station 110.

Referring FIG. 6A, at step 601, a base station determines, according to a length of a subframe transmitting data or control information and/or a frequency band where the subframe is located, a scrambling mode for the subframe transmitting data or control information. At step 603, the base station scrambles the subframe transmitting the data and the control information based on the scrambling mode determined at step 601, and transmits the data and the control information.

Here, the length of the subframe transmitting data or control information may be varied. The transmission of data or control information here may be performed on a PDSCH, a PDCCH or other physical channels, and the following description illustrated by taking a subframe transmitting a PDSCH as example is also applicable to other physical channels. For example, the length of the subframe is 1 ms, 0.5 ms or 0.25 ms. Moreover, for a user having a multiple of frequency bands in a single carrier, the subframe transmitting a PDSCH may be located on different frequency bands. In accordance with different lengths of the subframe transmitting a PDSCH and/or different frequency bands where the subframe transmitting a PDSCH is located, a scrambling mode for the subframe may be specifically determined.

The determining a scrambling mode according to the length of the subframe transmitting a PDSCH and/or the frequency band where the subframe transmitting a PDSCH is located is the same for both a UE and a base station. In other words, on the base station side, the base station determines, according to the length of the subframe transmitting a PDSCH and/or the frequency band where the subframe transmitting a PDSCH is located and in accordance with the determined principle, a scrambling mode for the PDSCH, and then scrambles the PDSCH in the determined scrambling mode; while on the UE side, the UE determines a scrambling mode for the PDSCH according to the same principle, and descrambles the PDSCH according to the scrambling mode for the PDSCH.

FIG. 6B illustrates a flow diagram for descrambling by a terminal in a wireless communication system according to various embodiments of the present disclosure. FIG. 6B exemplifies a method for operating the terminal 210 or the terminal 130.

Referring FIG. 6B, at step 651, a terminal receives a subframe transmitting data or control information. At step 653, the terminal determines, according to the length of the subframe transmitting data or control information and/or a frequency band where the subframe is located, a scrambling mode for the subframe transmitting data or control information. The processing in this step is the same as that in the step 603. At step 655, the terminal descrambles the subframe transmitting data or control information according to the scrambling mode determined in the step 653.

The various embodiments of the present disclosure for scrambling and descrambling will be further described below in details.

Embodiment 1

In this embodiment, scrambling and descrambling a PDSCH is performed according to the length of a subframe transmitting the PDSCH. Wherein, when determining the scrambling mode according to the length of the subframe transmitting the PDSCH, various existing scrambling modes can be adopted. In this embodiment, the description is given by taking scrambling or descrambling the subframe transmitting the PDSCH by using a scrambling sequence as example.

Specifically, during the existing process for scrambling or descrambling by using a scrambling sequence, the initial value of a scrambling sequence for each subframe is $c_{init}=n_{RNTI} \cdot 2^{14}+q \cdot 2^{13}+\lfloor n_s/2 \rfloor \cdot 2^9+N_{ID}^{cell}$. Where, $n_s$ denotes the serial number of a slot, $\lfloor n_s/2 \rfloor$ denotes the serial number of the subframe, and $\lfloor \cdot \rfloor$ is a rounding-down operation. However, when the length of the subframe transmitting PDSCH data is different, as shown in FIG. 7, and if subframes within different periods 710, 720, 730, 740 of time are different in length or subframes on different subbands 810, 820, 830 within a same period of time are different in length, as shown in FIG. 8, it is necessary to further consider how to determine the serial number of the slot in the formula for determining the initial value of the scrambling sequence for the subframe. In addition, some subframes 902, 903 may have two slots while subframe 901 may have only one slot, as shown in FIG. 9, or all subframes 1001 to 1003 may contain two slots although the subframes are different in length, as shown in FIG. 10. In this case, it is also necessary to consider whether to determine the initial value of the scrambling sequence according to the serial number of the slot or according to the serial number of the subframe.

In this embodiment, the initial value of the scrambling sequence is determined according to the length of the subframe transmitting the PDSCH, wherein, if the calculation formula of the initial value is assumed as $c_{init}=n_{RNTI} \cdot 2^{14}+q \cdot 2^{13}+\lfloor n_s/2 \rfloor \cdot 2^9+N_{ID}^{cell}$, the value of $\lfloor n_s/2 \rfloor \cdot 2^9$ is redefined according to the length of the subframe transmitting the PDSCH in this embodiment. In other words, the calculation formula of the initial value of the scrambling sequence is changed to $c_{init}=n_{RNTI} \cdot 2^{14}+q \cdot 2^{13}+Z+N_{ID}^{cell}$. How to determine the Z will be described below. Other items in the formula may also be altered, and the alterations to items other than Z in the formula will not be limited herein.

Preferably, within a radio frame where the subframe transmitting the PDSCH is located, it is possible to number all subframes or all slots by using a specified subframe length or a specified slot length as a numbering unit, and then determine the scrambling mode according to the subframe number or slot number of the subframe transmitting the PDSCH. In this embodiment, the initial value of the scrambling sequence is determined according to the subframe number or slot number of the subframe transmitting the PDSCH. More specifically, the Z in the formula for calculating the initial value is determined according to the subframe number or slot number of the subframe transmitting the PDSCH. Seven methods for determining the Z and the corresponding initial value of the scrambling sequence will be described.

Method 1:

In this method, within a radio frame where a subframe transmitting a PDSCH is located, all subframes within the radio subframes are numbered by using the length of the subframe transmitting the PDSCH as a numbering unit; and then, an initial value of a scrambling sequence is determined according to the subframe number of the subframe transmitting the PDSCH and in accordance with the formula $c_{init}=n_{RNTI} \cdot 2^{14}+q \cdot 2^{13}+X \cdot 2^9+N_{ID}^{cell}$, regardless of the lengths of other subframes, the X in the formula is the subframe number of the subframe transmitting the PDSCH within the radio frame where the subframe transmitting the PDSCH is located. In other words, the subframe length of the subframe transmitting the PDSCH is used as a specified subframe length; and, when determining the subframe number of the subframe transmitting the PDSCH, it is assumed that all subframes in a radio frame where the subframe transmitting the PDSCH is located have the same length as that of the subframe transmitting the PDSCH and are then numbered. The radio frame here can be a radio frame as in the LTE, and has a length of 10 ms.

For example, as shown in FIG. 11, in a radio frame m, a part of subframes have a length of 1 ms, while the other part of subframes have a length of 0.5 ms. If a PDSCH is transmitted on a subframe having a length of 1 ms, the number X=2 of the subframe 1103 transmitting the PDSCH is calculated according to the subframe length of 1 ms; and, if a PDSCH is transmitted on a subframe having a length of 0.5 ms, the number X=14 of the subframe 1109 transmitting the PDSCH is calculated according to the subframe length of 0.5 ms.

Method 2:

In this method, within a radio frame where a subframe transmitting a PDSCH is located, a numbering unit is determined according to the number of slots contained in the subframe transmitting the PDSCH, and all subframes within the radio frame are numbered. If the subframe transmitting the PDSCH is divided into two slots, all slots within the radio frame are numbered by using a slot length within the subframe transmitting the PDSCH as a numbering unit, and then an initial value of a scrambling sequence is determined according to a slot number of the subframe transmitting the PDSCH and in accordance with the formula $c_{init}=n_{RNTI} \cdot 2^{14}+q \cdot 2^{13}+\lfloor Y/2 \rfloor \cdot 2^9+N_{ID}^{cell}$, regardless of the lengths of other subframes, the Y in the formula is the slot number of a slot within the subframe transmitting the PDSCH within the radio frame where the subframe transmitting the PDSCH is located. If there is only one slot within the subframe transmitting the PDSCH, all subframes within the radio frame are numbered by using the subframe length of the subframe transmitting the PDSCH as a numbering unit, and then the initial value of the scrambling sequence is determined according to the subframe number of the subframe transmitting the PDSCH and in accordance with the formula $c_{init}=n_{RNTI} \cdot 2^{14}+q \cdot 2^{13}+\lfloor X \rfloor \cdot 2^9+N_{ID}^{cell}$, regardless of the lengths of other subframes, the X in the formula is the subframe number of the subframe transmitting the PDSCH within the radio frame where the subframe transmitting the PDSCH is located. In other words, when determining the slot number or subframe number of the subframe transmitting the PDSCH, it is assumed that all subframes within the radio frame where the subframe transmitting the PDSCH is located have the same length as that of the subframe transmitting the PDSCH and then the slots are numbered. The radio frame here can be a radio frame as in the LTE, and has a length of 10 ms. For example, as shown in FIG. 12, within a radio frame m, a part of subframes have a length of 1 ms, while the other part of subframes have a length of 0.5 ms. If a PDSCH is transmitted on a subframe having a length of 1 ms and the subframe having a length of 1 ms contains two slots, the slot number Y of the subframe 1203 transmitting the PDSCH is calculated according to the subframe length of 1 ms and the two slots contained in the subframe. If a PDSCH is transmitted on a subframe having a length of 0.5 ms, and the subframe having a length of 0.5 ms contains one slot, the subframe number X of the subframe 1209 transmitting the PDSCH is calculated according to the subframe length of 0.5 ms.

Method 3:

In this method, within a radio frame where a subframe transmitting a PDSCH is located, all subframes within the radio subframes are numbered by using the length of the longest subframe as a numbering unit; and then, an initial value of a scrambling sequence is determined according to the subframe number of the subframe transmitting the PDSCH and in accordance with the formula $c_{init}=n_{RNTI} \cdot 2^{14}+q \cdot 2^{13}+X \cdot 2^9+N_{ID}^{cell}$, where the X in the formula is the subframe number of the subframe transmitting the PDSCH within the radio frame where the subframe transmitting the PDSCH is located after the subframes are numbered according to the length of the longest subframe. In other words, when determining the subframe number of the subframe transmitting the PDSCH, if the length of the subframe transmitting the PDSCH is the length of the longest subframe, the serial number of the subframe transmitting the PDSCH (in the present disclosure, the serial number of a subframe indicates that this subframe is which subframe in the radio subframe, if numbering from 0) is the subframe number of the subframe transmitting the PDSCH. If the length of the subframe transmitting the PDSCH is less than that of the longest subframe within the radio frame where the subframe transmitting the PDSCH is located, and if the radio subframe is divided into a number of longest subframes by using the length of the longest length as a unit, a multiple of actual subframes within a same longest subframe have a same subframe number. In other words, the subframe transmitting the PDSCH has a same subframe number as other actual subframes within the same longest subframe. For example, as shown in FIG. 13, within a radio frame m, if a part of subframes have a length of 1 ms while the other part of subframes have a length of 0.5 ms, the length of the longest subframe is 1 ms. According to the length of 1 ms of the longest subframe, all subframes are numbered to obtain a subframe number of each subframe. If a PDSCH is transmitted on a subframe 1303 having a length of 1 ms, an initial value of a scrambling sequence for the PDSCH is calculated according to the subframe number of the subframe transmitting the PDSCH; and, if a PDSCH is transmitted on a subframe 1309 having a length of 0.5 ms, the initial value of the scrambling sequence for the PDSCH is calculated according to a same subframe number of the subframe B transmitting the PDSCH and another actual subframe C having a length of 0.5 ms within a same longest subframe.

Method 4:

In this method, within a radio frame where a subframe transmitting a PDSCH is located, all subframes within the radio subframes are numbered by using the length of the shortest subframe as a numbering unit; and then, an initial value of a scrambling sequence is determined according to the subframe number of the subframe transmitting the PDSCH and in accordance with the formula $c_{init}=n_{RNTI} \cdot 2^{14}+q \cdot 2^{13}+X \cdot 2^9+N_{ID}^{cell}$, where the X in the formula is the subframe number of the subframe transmitting the PDSCH within the radio frame where the subframe transmitting the PDSCH is located after the subframes are numbered according to the length of the shortest subframe. In other words, when determining the subframe number of the subframe transmitting the PDSCH, if the length of the subframe transmitting the PDSCH is the length of the shortest subframe, the serial number of the subframe transmitting the PDSCH is the subframe number of the subframe transmitting the PDSCH. If the length of the subframe transmitting the PDSCH is greater than that of the shortest subframe within the radio frame where the subframe transmitting the PDSCH is located, the subframe transmitting the PDSCH corresponds to a multiple of different subframe numbers. Preferably, the initial value of the scrambling sequence can be calculated by using the serial number of the shortest subframe as the smallest value of the serial numbers of a multiple of shortest subframes contained in the subframe transmitting the PDSCH. For example, as shown in FIG. 14, within a radio frame m, if a part of subframes have a length of 1 ms while the other part of subframes have a length of 0.5 ms, the length of the shortest subframe is 0.5 ms. According to the length of 0.5 ms of the shortest subframe, all subframes are numbered to obtain subframe numbers. If a PDSCH is transmitted on a subframe having a length of 0.5 ms, an initial value of a scrambling sequence for the PDSCH is calculated by using a subframe number corresponding to the subframe transmitting the PDSCH; and, if a PDSCH is transmitted on a subframe having a length of 1 ms, the subframe transmitting the PDSCH corresponds two subframe numbers, and the initial value of the scrambling sequence is calculated according to the smallest value of the first shortest subframe of the two shortest subframes each having a length of 0.5 ms contained in the 1 ms subframe transmitting the PDSCH. Of source, the initial value can also be calculated by using the largest value.

Method 5:

In this method, a UE determines a specified subframe length as a number unit by receiving a higher-layer signaling or system information or presetting by protocol. The specified subframe length is called the determined subframe length. For example, the subframe length for subframe sequencing is 1 ms, the subframes are numbered according to the determined subframe length, and an initial value of a scrambling sequence is determined according to the subframe number of the subframe transmitting the PDSCH and in accordance with the formula $c_{init}=n_{RNTI} \cdot 2^{14}+q \cdot 2^{13}+X \cdot 2^9+N_{ID}^{cell}$, where the X in the formula is the subframe number of the subframe transmitting the PDSCH within the radio frame where the subframe transmitting the PDSCH is located after the subframes are numbered according to the determined subframe length.

If the length of the subframe transmitting the PDSCH is the determined subframe length, the serial number of the subframe transmitting the PDSCH is the subframe number of the subframe transmitting the PDSCH.

If the length of the subframe transmitting the PDSCH is less than the determined subframe length, and if the radio frame is divided into a number of determined subframes by using the determined subframe length as a unit, a multiple of actual subframes within a same determined subframe have a same subframe number. In other words, the subframe transmitting the PDSCH has a same subframe number as other actual subframes within the same determined subframe. For example, as shown in FIG. 13, within a radio frame m, a part of subframes have a length of 1 ms, the other part of subframes have a length of 0.5 ms, and the determined subframe length is 1 ms. According to the determined subframe length of 1 ms, all subframes within the radio frame are numbered to obtain subframe numbers. If a PDSCH is transmitted on a subframe having a length of 1 ms, an initial value of a scrambling sequence for the PDSCH is calculated according to the subframe number of the subframe transmitting the PDSCH; and, if a PDSCH is transmitted on a subframe having a length of 0.5 ms, the initial value of the scrambling sequence for the PDSCH is calculated according to a same subframe number of this subframe transmitting the PDSCH and another actual subframe having a length of 0.5 ms within the same determined subframe.

If the length of the subframe transmitting the PDSCH is greater than the determined subframe length, the subframe transmitting the PDSCH has a multiple of subframe numbers, and the initial value of the scrambling sequence is calculated according to one of the subframe numbers. For example, as shown in FIG. 14, within a radio frame m, a part of subframes have a length of 1 ms, the other part of subframes have a length of 0.5 ms, and the determined subframe length is assumed as 0.5 ms. According to the determined subframe length of 0.5 ms, all subframes within the radio frame are numbered to obtain subframe numbers. If a PDSCH is transmitted on a subframe having a length of 0.5 ms, the initial value of the scrambling sequence for the PDSCH is calculated according to the subframe number of the subframe transmitting the PDSCH; and, if a PDSCH is transmitted on a subframe having a length of 1 ms, the subframe transmitting the PDSCH corresponds to two subframe numbers. Preferably, the initial value of the scrambling sequence for the PDSCH can be calculated according to the smallest value of the two subframe numbers.

Method 6:

In this method, a UE can determine a specified subframe length as a numbering unit by receiving a higher-layer signaling or system information or presetting by protocol; or, the UE can also use the length of the longest subframe within a radio subframe where a subframe transmitting a PDSCH is located as a specified subframe length. Hereinafter, the specified subframe length is called the determined subframe length. All subframes within the radio frame where the subframe transmitting the PDSCH is located are first numbered according to the determined subframe length. If a multiple of subframes within the radio frame have a same subframe number, a multiple of subframes having a same subframe number are secondarily numbered according to the actual subframe length to obtain secondary subframe numbers. When the determined subframe length contains a multiple of mini-subframes having a length less than the determined subframe length, the determined multiple of mini-subframes, within the determined subframe length, having a length less than the determined subframe length are further numbered. For example, the determined subframe length is 1 ms, and all subframes are numbered and sequenced according to the determined subframe length. If a subframe having a length of 1 ms contains two subframes each having a length of 0.5 ms, the two subframes each having a length of 0.5 ms correspond to a same subframe number, and the subframes each having a length of 0.5 ms are called secondary subframes. The two secondary subframes each having a length of 0.5 ms within the subframe having a length of 1 ms are numbered, so the secondary subframe number of the first secondary subframe 1409 is 0, and the secondary subframe number of the second secondary subframe 1410 is 1, as shown in FIG. 14.

According to the subframe number and secondary subframe number of the subframe transmitting the PDSCH, an initial value of the scrambling sequence is determined in accordance with the formula $c_{init}=n_{RNTI} \cdot 2^{14}+q \cdot 2^{13}+X \cdot 2^9+Y' \cdot 2^M+N_{ID}^{cell}$, where the X in the formula is the subframe number determined after the subframes are numbered according to the determined subframe length, and the Y' in the formula is the secondary subframe number after secondary numbering. If the subframe number of a certain subframe is different from the subframe numbers of other subframes (that is, the length of this subframe is equal to the determined subframe length), the secondary subframe number of this subframe is set as 0, and the M in the formula can be a preset value determined according to a protocol. For example, M is equal to 15.

Method 7:

In this method, a UE can determine a specified subframe length as a numbering unit by receiving a higher-layer signaling or system information or presetting by protocol; or, the UE can also use the length of the longest subframe within a radio subframe where a subframe transmitting a PDSCH is located as a specified subframe length. Hereinafter, the specified subframe length is called a determined subframe length. Subframes are first numbered according to the determined subframe length. According to the subframe number of the subframe transmitting the PDSCH, an initial value of the scrambling sequence is determined in accordance with the formula $c_{init}=n_{RNTI} \cdot 2^{14}+q \cdot 2^{13}+X \cdot 2^9+N_{ID}^{cell}$, where the X in the formula is the subframe number determined after the subframes are numbered according to the determined subframe length. Then, the scrambling sequence c(i) is generated. A method for generating the scrambling sequence refers to Section 7.2 of the protocol 3GPP TS 36.211 V8.9.0 (2009 December). If the length of the subframe transmitting the PDSCH is the determined subframe length, the PDSCH is directly scrambled or descrambled by using the c(i). If the length of the subframe transmitting the PDSCH is less than the determined subframe length, and if the subframe transmitting the PDSCH is a first shortened subframe among determined subframes of subframe corresponding to the subframe number of the subframe transmitting the PDSCH, the PDSCH is directly scrambled or descrambled by using the c(i), where i starts from 0. If the subframe transmitting the PDSCH is a second shortened subframe among the subframes corresponding to the subframe number of the subframe transmitting the PDSCH, the PDSCH is directly scrambled or descrambled by using the c(i), where i starts from P. If the subframe transmitting the PDSCH is the $n^{th}$ shortened subframe among the subframes corresponding to the subframe number of the subframe transmitting the PDSCH, the PDSCH is directly scrambled or descrambled by using the c(i), where i starts from (n−1)P. A method for determining the value of P is determined by a higher-layer signaling or preset by a protocol. Another method for determining the value of P is by calculation. For example, the number of bits possibly transmitted within a shortened subframe in a highest-order modulation and coding mode within a system bandwidth is used as P.

In the processing of this embodiment, when the specified subframe length is used as a numbering unit, the specified subframe length is different from the subframe length of at least one subframe within the radio frame where the subframe transmitting the PDSCH is located. For another example, when the specified slot length is used as a numbering unit, the specified slot length is different from the slot length of at least one slot within the radio frame, or subframe lengths of at least two subframes within the radio frame are different.

As described above, in this embodiment, for the radio frame where the subframe transmitting the PDSCH is located, all subframes are numbered by using a fixed length as a numbering unit, and the scrambling mode is determined by the serial numbers determined according to the unified numbering unit. Wherein, since there may be subframes of various different lengths within the radio frame, the rational and effective scrambling and descrambling are realized by numbering the subframes of different lengths according to the unified length unit in the above way. Or, within the corresponding radio frame, all subframes may also have a same length, but the specified subframe length as a numbering unit is different from the actual subframe length in the radio frame, so that the scrambling and descrambling of the PDSCH can still be realized effectively. Meanwhile, for different radio frames, the specified subframe length or specified slot length as a number unit may also be different. Wherein, when numbering subframes or slots within a radio frame, the subframes or slots within the radio frame can be numbered sequentially, or can also be numbered according to a preset numbering rule. The specific numbering rule is not limited in the present disclosure as long as the base station and the UE can perform numbering in a same way.

Embodiment 2

Since different subcarrier widths are adopted on different frequency bands, OFDM symbols are different in length, and subframes are also different in length, a corresponding scrambling mode can be determined for different frequency bands, as shown in FIG. 8. Specifically, the scrambling mode can be determined according to a frequency band where a subframe transmitting a PDSCH is located. Still by taking scrambling and descrambling by using a scrambling sequence as example, an initial value of the scrambling sequence can be determined according to the frequency band where the subframe transmitting the PDSCH is located. For example, the initial value of the scrambling sequence can be determined in accordance with the formula $c_{init}=n_{RNTI} \cdot 2^{14} + q \cdot 2^{13} + Z + B_{ID} + N_{ID}^{cell}$, or in accordance with the formula $c_{init}=n_{RNTI} \cdot 2^{14} + q \cdot 2^{13} + Z + B_{ID} \cdot 2^{N} + N_{ID}^{cell}$, where $B_{ID}$ is a frequency band index and configured by a higher-layer signaling, the N in the formula is a preset value determined according to a protocol, and the Z can be a value determined in any way in Embodiment 1, or can be $\lfloor n_s/2 \rfloor \cdot 2^9$. More specifically, as shown in FIG. 15, there are three frequency band indexes since there are three frequency bands 1510, 1520, 1530, and an initial value of a scrambling sequence for each frequency band is calculated according to different frequency band index values of each frequency band.

The two embodiments are specific implementations of the scrambling method and the descrambling method provided in the present disclosure. The present disclosure further provides a scrambling equipment and a descrambling equipment, which can be used for performing the scrambling method and descrambling method described above.

FIG. 16 illustrates a configuration of an apparatus for scrambling in a wireless communication system according to various embodiments of the present disclosure. FIG. 16 exemplifies a part of controller 240 of the base station.

Referring FIG. 16, the apparatus comprises a scrambling sequence determination unit 1610 and a scrambling unit 1620.

The scrambling sequence determination unit 1610 is configured to determine, according to a length of a subframe transmitting data or control information and/or a frequency band where the subframe transmitting data or control information is located, a scrambling mode for the subframe transmitting data or control information. The scrambling unit 1620 is configured to scramble and transmit the subframe transmitting data or control information according to the determined scrambling mode.

FIG. 17 illustrates a configuration of an apparatus for descrambling in a wireless communication system according to various embodiments of the present disclosure. FIG. 17 exemplifies a part of controller 330 of the terminal.

Referring FIG. 17, the apparatus comprises a scrambling sequence determination unit 1710 and a descrambling unit 1720.

The scrambling sequence determination unit 1710 is configured to receive a subframe transmitting data or control information, and determine, according to a length of the subframe transmitting data or control information and/or a frequency band where the subframe transmitting data or control information is located, a scrambling mode for the subframe transmitting data or control information. The descrambling unit 1720 is configured to descramble the subframe transmitting data or control information according to the determined scrambling mode.

Embodiment 3

According to various embodiments, the system may support two or more different types of services. For example, the system may support at least two services among an enhanced mobile broadband (eMBB) service corresponding to data communication based on an improved transmission rate, an ultra-reliable low latency communication (URLLC) service based on an ultra-low latency and a high reliability, and an enhanced machine-type communication (eMTC) service corresponding to large-scale Internet of Things-based communication, which is a data communication service capable of acquiring and transmitting necessary information anytime and anywhere by establishing wireless connections between objects without direct manipulation or intervention on the part of a person. A single base station may simultaneously support the plurality of services described above. Accordingly, for example, one terminal may receive an eMBB service and another terminal may receive a URLLC service.

For ease of description, the eMBB service will be referred to as one of "data communication", "data communication service", or a term having an equivalent technical meaning, and each of the terms should be understood as having the same meaning even if the terms are used in combination. Further, a URLLC service will be referred to as one of an "ultra-low latency service", a "high-reliability service", "ultra-low latency communication", "high-reliability communication", and terms having equivalent technical meaning, and each of the terms should be understood as having the same meaning even if the terms are used in combination.

In order to satisfy high reliability and low latency, which are required in a URLLC service, application of a shorter TTI to the URLLC service compared to an eMBB service and various operation schemes are under discussion. For example, in a downlink network environment, a scenario, in which an eMBB service is scheduled and operated based on an eMBB slot and a URLLC service is scheduled and operated based on a URLLC slot shorter than an eMBB slot, is being considered. According to this, the base station may be in a situation where it is required to transmit a URLLC packet while transmitting previously scheduled eMBB data. In a case where it is required to transmit a URLLC packet while transmitting previously scheduled eMBB data, due to a characteristic of the URLLC service requiring a low latency, the base station 110 is required to reallocate some resources allocated to the eMBB service in order to provide the URLLC service. Such reallocation-based multiplexing may be referred to as "preemption-based multiplexing".

The eMBB service and the URLLC service may use different subcarrier spaces. Since different services adopt different subcarrier spaces, for example, the eMBB and an ultra-reliable low delay will adopt different subcarrier spaces, and the URLLC will occupy resources which have been scheduled for transmitting eMBB data, as shown in FIG. 18. When the eMBB and the URLLC adopt different subcarrier spaces for transmission, and when the URLLC occupies resources which have been scheduled for transmitting the eMBB, the resources 1810 for transmitting the eMBB and the resources 1820 for transmitting the URLLC may be scheduled to a same UE by a base station, or the resources 1810 for transmitting the eMBB and the resources 1820 for transmitting the URLLC may also be scheduled to different UEs by the base station.

FIG. 19A illustrates a flow diagram showing an operation of a base station in a wireless communication system according to various embodiments of the present disclosure. FIG. 19A exemplifies a method for operating the base station 110.

Referring to FIG. 19A, in step 1901, the base station allocates a resource for a first service. For example, the first service may include an eMBB service. The resource for the first service may be allocated according to a numerology corresponding to the first service, for example, a slot or TTI defined based on a first subcarrier interval.

In step 1903, the base station allocates a resource for a second service. For example, the second service may include a URLLC service. The resource for the second service may be allocated according to a numerology corresponding to the second service, for example, a slot or TTI defined based on a second subcarrier interval. Here, the TTI or the slot corresponding to the second service may be shorter than the TTI or the slot corresponding to the first service. In this case, the resource for the second service may be allocated based on preemption-based multiplexing. Therefore, in order to allocate the resource for the second service, the base station may puncture at least a part of the resource allocated to the first service. That is, the second service has a higher priority than the first service.

In step 1905, the base station transmits indication information relating to the resource for the second service. The indication information may indicate that the resource for the second service has been allocated, in other words, at least a part of the resource for the first service has been punctured. In addition, the indication information may indicate a position and a size of the resource for the second service. According to an embodiment, the indication information may be transmitted before or after signal transmission through the resource for the second service.

FIG. 19B illustrates a flow diagram showing an operation of a terminal in a wireless communication system according to various embodiments of the present disclosure. FIG. 19B exemplifies a method for operating the terminal 120 or the terminal 130.

Referring to FIG. 19B, in step 1951, the terminal receives a first service signal. Before the terminal receives the first service signal, the terminal may receive allocation information relating to a resource for a first service. Accordingly, the terminal receives a signal received through a resource indicated by the allocation information.

In step 1953, the terminal receives indication information relating to a resource for a second service. The indication information may indicate that the resource for the second service has been allocated, in other words, at least a part of the resource for the first service has been punctured. In addition, the indication information may indicate a position and a size of the resource for the second service. According to an embodiment, the indication information may be transmitted before or after signal transmission through the resource for the second service. Further, the indication information may be received before or after completion of reception of the first service signal.

In step 1955, the terminal decodes the first service signal. At this time, the terminal may distinguish a valid first service signal by using the indication information for the resource for the second service. That is, since at least a part of the resource indicated by the allocation information has been punctured for the resource allocated to the second service, the terminal performs decoding for the remaining part of the resource indicated by the allocation information, excluding a second service signal which exists in the punctured resource area.

As described with reference to FIG. 19A and FIG. 19B, indication information relating to a resource for a second service, for example, a URLLC service, may be transmitted from the base station to the terminal. Specific examples of the indication information will be described below with reference to FIG. 20A and FIG. 20B.

If the base station needs to inform the UE of which resources have been occupied by the URLLC, indication information 2002 about the resources occupied by the URLLC can be transmitted by a slot (mini-slot) transmitting the URLLC or a slot (mini-slot) before transmitting the URLLC, as shown in FIG. 20a. Or, the indication information 2004 about the resources occupied by the URLLC is transmitted on the first k (the k is a positive integer, and is configured by a higher-layer signaling or determined by presetting) OFDM symbols of the first slot following the current eMBB slot, as shown in FIG. 20b. In other words, the indication information about the resources occupied by the URLLC is transmitted in a slot n+1 in order to indicate the situation of the resources occupied by the URLLC in a slot n. In this way, the situation of, within a slot n, the resources occupied by the URLLC within a multiple of mini-slots can be indicated.

An indication unit of the indication information about the resources occupied by the URLLC in a frequency domain can be one physical resource block, or N (the N is a positive integer, and is configured by a higher-layer signaling or preset by a protocol) physical resource blocks. The N physical resource blocks are called a Physical Resource Group (PRG), and the physical resource block or the PRG is determined by using a URLLC subcarrier space as a unit. When the UE processes eMBB data or receives a reference signal, the physical resource blocks of the eMBB resources occupied by the URLLC can be determined by the correspondence of subcarrier spaces between the URLLC and the eMBB. The indication information about the resources occupied by the URLLC can be transmitted by public Downlink Control information (DCI) or by UE-group DCI.

The indication of the resources occupied by the URLLC comprises the following four methods.

Method 1:

If physical resources occupied by the URLLC are continuous, the resources occupied by the URLLC can be determined by indicating a starting position of physical resource blocks (or PRGs) occupied by the URLLC and indicating the number of physical resource blocks (PRGs) occupied by the URLLC. The starting position of the physical resource blocks (or PRGs) occupied by the URLLC can be configured by a higher-layer signaling, or indicated by a physical layer signaling. The number of physical resource blocks (PRGs) occupied by the URLLC is indicated by a physical layer signaling, or the starting position of the physical resource blocks (or PRGs) occupied by the URLLC and the number of physical resource blocks (PRGs) occupied by the URLLC are collectively indicated by a physical layer signaling. By adopting continuous physical resources to transmit the URLLC, guard bands between the resources for the URLLC and the resources for the eMBB can be reduced.

Method 2:

If the physical resources occupied by the URLLC are discrete, physical resource blocks (or PRGs) occupied by the URLLC can be indicated by bit mapping. A specific method is as follows: within a system bandwidth or a bandwidth configured by a higher-layer signaling, the number of physical resource blocks (or PRGs) contained within the system bandwidth or the bandwidth configured by the higher-layer signaling is determined according to the subcarrier space for the URLLC, and whether each physical resource block (or PRG) is occupied by the URLLC is indicated by 1 bit. For example, if the indication bit value is "0", the physical resource block (or PRG) is not occupied by the URLLC, and, when the indication bit value is "1", the physical resource block (or PRG) is occupied by the URLLC. By adopting discrete physical resources to transmit the URLLC, the diversity performance of the URLLC can be improved.

Method 3:

When the URLLC and the eMBB adopt different subcarrier spaces, the physical resources occupied by the URLLC are continuous, and indicated by Method 1. When the URLLC and the eMBB adopt a same subcarrier space, the physical resources occupied by the URLLC can be continuous or discrete, which is configured by a higher-layer signaling or preset by a protocol.

Method 4:

Whether an eMBB slot is occupied by the URLLC is indicated by 1-bit indication information. For example, when the indication bit value is "0", the system bandwidth or the bandwidth configured by the higher-layer signaling is not occupied by the URLLC; and, when the indication bit value is "1", the system bandwidth or the bandwidth configured by the higher-layer signaling is occupied by the URLLC.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A base station in a wireless communication system, the base station comprising:
   a transceiver; and
   at least one processor coupled to the transceiver, the at least one processor is configured to:
      transmit, to a user equipment (UE), configuration information via a higher layer signaling, the configuration information including information on a resource unit associated with indication information, and
      transmit, to the UE, downlink control information (DCI) including the indication information including a bitmap,
   wherein the indication information indicates at least one resource group, in which no transmission to the UE is present,
   wherein the at least one resource group is indicated by the bitmap of the indication information among a plurality of resource groups based on the information on the resource unit associated with the indication information, the plurality of resource groups corresponding to a plurality of bits of the bitmap, and
   wherein the plurality of resource groups in a time domain is located prior to a slot in which the DCI is transmitted.

2. The base station of claim 1,
   wherein the DCI is transmitted on one or more symbols of the slot, and
   wherein a number of the one or more symbols of the slot is configured by a higher layer signaling.

3. The base station of claim 1, wherein a size of each of the plurality of resource groups in a frequency domain is configured by the information on the resource unit associated with the indication information.

4. The base station of claim 1, the at least one processor is further configured to:
   allocate a first resource to the UE, and
   allocate a second resource to another UE based on pre-emption-based multiplexing,
   wherein the indication information is transmitted, if the second resource overlapped to at least part of the first resource.

5. The base station of claim 1,
wherein if a value of a bit in the indication information is zero, the bit indicates that transmission to the UE is present in a resource group corresponding to the bit, and
wherein if a value of the bit in the indication information is one, the bit indicates that no transmission to the UE is present in the resource group corresponding to the bit.

6. The base station of claim 1, wherein the DCI comprises a UE-group DCI for a group of UEs.

7. The base station of claim 1, wherein the at least one resource group is indicated based on a difference between a subcarrier spacing for receiving the DCI and a subcarrier spacing for resources indicated by the indication information.

8. The base station of claim 1,
wherein the at least one resource group is occupied by other UE for a low-latency communication, and
wherein the at least one resource group includes a resource allocated to the UE.

9. A user equipment (UE) in a wireless communication system, the UE comprising:
a transceiver; and
at least one processor coupled to the transceiver, the at least one processor is configured to:
receive, from a base station, configuration information via a higher layer signaling, the configuration information including information on a resource unit associated with indication information,
receive, from the base station, downlink control information (DCI) including the indication information including a bitmap, and
identify that no transmission to the UE is present in at least one resource group indicated by the indication information,
wherein the at least one resource group is indicated by the bitmap of the indication information among a plurality of resource groups based on the information on the resource unit associated with the indication information, the plurality of resource groups corresponding to a plurality of bits of the bitmap, and
wherein the plurality of resource groups in a time domain is located prior to a slot in which the DCI is received.

10. The UE of claim 9,
wherein the DCI is received on one or more symbols of the slot, and
wherein a number of the one or more symbols of the slot is configured by a higher layer signaling.

11. The UE of claim 9,
wherein a size of each of the plurality of resource groups in a frequency domain is configured by the information on the resource unit associated with the indication information.

12. The UE of claim 9,
wherein if a value of a bit in the indication information is zero, the bit indicates that transmission to the UE is present in a resource group corresponding to the bit, and
wherein if a value of the bit in the indication information is one, the bit indicates that no transmission to the UE is present in the resource group corresponding to the bit.

13. The UE of claim 9, wherein the DCI comprises a UE-group DCI for a group of UEs.

14. The UE of claim 9, wherein the at least one resource group is indicated based on a difference between a subcarrier spacing for receiving the DCI and a subcarrier spacing for resources indicated by the indication information.

15. The UE of claim 9,
wherein the at least one resource group is occupied by other UE for a low-latency communication, and
wherein the at least one resource group includes a resource allocated to the UE.

16. A method performed by a base station in a wireless communication system, the method comprising:
transmitting, to a user equipment (UE), configuration information via a higher layer signaling, the configuration information including information on a resource unit associated with indication information; and
transmitting, to the UE, downlink control information (DCI) including the indication information including a bitmap,
wherein the indication information indicates at least one resource group, in which no transmission to the UE is present,
wherein the at least one resource group is indicated by the bitmap of the indication information among a plurality of resource groups based on the information on the resource unit associated with the indication information, the plurality of resource groups corresponding to a plurality of bits of the bitmap, and
wherein the plurality of resource groups in a time domain is located prior to a slot in which the DCI is transmitted.

17. The method of claim 16,
wherein the DCI is transmitted on one or more symbols of the slot, and
wherein a number of the one or more symbols of the slot is configured by a higher layer signaling.

18. The method of claim 16, wherein a size of each of the plurality of resource groups in a frequency domain is configured by the information on the resource unit associated with the indication information.

19. The method of claim 16, further comprising:
allocating a first resource to the UE; and
allocating a second resource to another UE based on preemption-based multiplexing,
wherein the indication information is transmitted if the second resource overlapped to at least part of the first resource.

20. The method of claim 16,
wherein if a value of a bit in the indication information is zero, the bit indicates that a resource in which transmission to the UE is present in the resource group corresponding to the bit, and
wherein if a value of the bit in the indication information is one, the bit indicates that no transmission to the UE is present in the resource group corresponding to the bit.

21. The method of claim 16, wherein the DCI comprises a UE-group DCI for a group of UEs.

22. The method of claim 16, wherein the at least one resource group is indicated based on a difference between a subcarrier spacing for receiving the DCI and a subcarrier spacing for resources indicated by the indication information.

23. The method of claim 16,
wherein the at least one resource group is occupied by other UE for a low-latency communication, and
wherein the at least one resource group includes a resource allocated to the UE.

* * * * *